(12) United States Patent
Blair et al.

(10) Patent No.: US 8,535,616 B2
(45) Date of Patent: *Sep. 17, 2013

(54) SUB-WAVELENGTH METALLIC APERTURES AS LIGHT ENHANCEMENT DEVICES

(75) Inventors: Steven M. Blair, Salt Lake City, UT (US); Mohit Diwekar, Salt Lake City, UT (US); Sachin Attavar, Salt Lake City, UT (US); Alexander Chagovetz, Salt Lake City, UT (US); Mark Alan Davis, Springville, UT (US); John Dredge, Cedar Hills, UT (US)

(73) Assignees: Moxtek, Inc., Orem, UT (US); University of Utah Research Foundation, Salt Lake City, UT (US)

(*) Notice: Subject to any disclaimer, the term of this patent is extended or adjusted under 35 U.S.C. 154(b) by 900 days.

This patent is subject to a terminal disclaimer.

(21) Appl. No.: 12/603,242

(22) Filed: Oct. 21, 2009

(65) Prior Publication Data

US 2010/0118390 A1 May 13, 2010
US 2013/0182315 A9 Jul. 18, 2013

Related U.S. Application Data

(63) Continuation-in-part of application No. 11/497,581, filed on Aug. 2, 2006.

(60) Provisional application No. 61/114,322, filed on Nov. 13, 2008, provisional application No. 61/169,113, filed on Apr. 14, 2009, provisional application No. 61/177,891, filed on May 13, 2009, provisional application No. 60/705,216, filed on Aug. 2, 2005, provisional application No. 60/795,110, filed on Apr. 26, 2006.

(51) Int. Cl.
*G01N 21/00* (2006.01)
*G01N 21/78* (2006.01)

(52) U.S. Cl.
USPC ........ 422/400; 422/407; 422/82.05; 436/164; 436/165; 250/216; 250/201.3

(58) Field of Classification Search
USPC .............. 436/164, 165; 422/82.05, 400, 407; 250/201.3, 216
See application file for complete search history.

(56) References Cited

U.S. PATENT DOCUMENTS

| | | |
|---|---|---|
| 5,033,291 A | 7/1991 | Podoloff et al. |
| 5,408,873 A | 4/1995 | Schmidt et al. |

(Continued)

FOREIGN PATENT DOCUMENTS

| | | |
|---|---|---|
| WO | WO 2007/094817 | 8/2007 |
| WO | WO 2009/023716 | 2/2009 |

OTHER PUBLICATIONS

Louarn et al., "Prediction of the transmitted light through a nanoaperture of SNOM Probes," Proceedings of the COMSOL Users Conference 2006, 4 pages, Paris.

(Continued)

*Primary Examiner* — Lyle Alexander
(74) *Attorney, Agent, or Firm* — Thorpe North & Western LLP

(57) ABSTRACT

Light enhancement devices, applications for the light enhancement devices, and methods for making the light enhancement devices are provided. The light enhancement devices include a substrate and a film of metal disposed over the substrate, the film of metal including at least one cavity. The cavity may be of various shapes depending on the desired application.

14 Claims, 21 Drawing Sheets

(56) References Cited

U.S. PATENT DOCUMENTS

| | | | |
|---|---|---|---|
| 5,627,922 | A | 5/1997 | Kopelman et al. |
| 5,677,196 | A | 10/1997 | Herron et al. |
| 5,678,448 | A | 10/1997 | Fullen et al. |
| 5,770,456 | A | 6/1998 | Holmes |
| 5,929,332 | A | 7/1999 | Brown |
| 5,973,316 | A | 10/1999 | Ebbesen et al. |
| 6,285,020 | B1 | 9/2001 | Kim et al. |
| 6,514,768 | B1 | 2/2003 | Guire et al. |
| 6,579,680 | B2 | 6/2003 | Frutos et al. |
| 6,649,901 | B2 | 11/2003 | Thio et al. |
| 6,777,244 | B2 | 8/2004 | Pepper et al. |
| 6,917,726 | B2 | 7/2005 | Levene et al. |
| 6,969,850 | B2 | 11/2005 | Staats |
| 7,013,054 | B2 | 3/2006 | Levene et al. |
| 7,171,331 | B2 | 1/2007 | Vock et al. |
| 7,181,122 | B1 | 2/2007 | Levene et al. |
| 7,272,079 | B2 | 9/2007 | Challener |
| 7,302,146 | B2 | 11/2007 | Turner et al. |
| 7,648,441 | B2 | 1/2010 | Silk |
| 2003/0017450 | A1 | 1/2003 | Oon et al. |
| 2003/0032076 | A1 | 2/2003 | Duffy et al. |
| 2003/0148401 | A1 | 8/2003 | Agrawal et al. |
| 2003/0173501 | A1 | 9/2003 | Thio et al. |
| 2003/0180191 | A1 | 9/2003 | Suzuki et al. |
| 2004/0029152 | A1 | 2/2004 | Ishida |
| 2004/0125190 | A1 | 7/2004 | Koyama |
| 2007/0202478 | A1 | 8/2007 | Al-Obaidi et al. |
| 2008/0032301 | A1 | 2/2008 | Rank et al. |
| 2008/0297757 | A1 | 12/2008 | Hahn |
| 2010/0256016 | A1* | 10/2010 | Blair et al. ............... 506/13 |

OTHER PUBLICATIONS

Heng et al., :Nano-aperture array based optical imaging system on a microfluidic chip, IEEE, 2006, 2 pages.

Bargiel et al, "A micromachined silicon-based probe for a scanning near-field optical microscope on-chip," Institute of Physics Publishing, Measurement Science and Technology, 2006, pp. 32-37, vol. 17.

Archer et al., "Fabrication and characterization of silicon microfunnels and tapered micro-channels for stochastic sensing applications," Sensors 2008, pp. 3848-3872, vol. 8.

Verhagen et al., "Nanofucusing in laterally tapered plasmonic waveguides," Optics Express, Jan. 7, 2008, pp. 45-57, vol. 16, No. 1.

Szunerits et al., "Fabrication of a sub-micrometer electrode array: elecrochemical characterization and mapping of an electroactive species by confocal raman microspectroscopy," Electroanalysis 2003, pp. 548-555, vol. 15 No. 5-6.

Lezec et al., "Diffracted evanescent wave model for enhnaced and suppressed optical transmission through subwavelength hole arrays," Optics Express, Aug. 9, 2004, pp. 3629-3651, vol. 12 No. 16.

Genet et al., "Fano-type interpretation of red shifts and red tails in hole array transmission spectra," Optic Communications, Jul. 18, 2003, pp. 331-336.

Ebbesen et al., "Extraordinary optical transmission through subwavelength hole arrays," Nature Feb. 12, 1998, pp. 667-669, vol. 391.

Martin-Moreno et al., "Theory of extraordinary optical transmission through subwavelength hole arrays," The American Physical Society, Feb. 5, 2001 pp. 1114-1117, vol. 86, No. 6.

Heller, M.J. DNA microarray technologies: Devices, systems and applications Annu Rev Biomed Eng. 4, 129 (2002).

Y. Liu, F Hahdavi, and S. Blair Enhanced fluorescence transduction properties of metallic cavity arrays, IEEE j. selected topics in quantum elecronic 11, 778 (2005).

S. Fore, Y, Yuen, L. Hesselink, T. Huser "Pulsed-interleaved excitation FRET measurements on single duplex DNA molecules inside C-shaped Nanoapertures" Nano Letter 7 1749 (2007).

Guiller et al; Linkers and Cleavage Strategies in Solid-Phase Organic Synthesis and Combinatorial Chemistry; Chemical Reviews; May 6, 2000; pp. 2091-2157; vol. 100.

Liu et al; Fluorescence Enhancement from an Array of Subwavelength Metal Apertures; Optics Letters; Apr. 1, 2003; pp. 507-509; vol. 28.

Bauer et al; Biological Applications of High Aspect Ratio Nanoparticles; Journal of Materials Chemistry; Jan. 14, 2004; pp. 517-526; vol. 14.

Murphy et al; Probing Single-Stranded DNA Conformational Flexibility Using Fluorescence Spectroscopy; Biophysical Journal; Apr. 2004; pp. 2530-2537; vol. 86.

U.S. Appl. No. 12/191,134, filed Aug. 13, 2008; Alexander Chagovetz; office action issued Sep. 9, 2011.

Liu et al; Biosensing Based upon Molecular Confinement in Metallic Nanocavity Arrays; Proceedings of the SPIE—The International Society for Optical Engineering SPIE—Int. Soc. Opt. Eng USA; Apr. 11, 2005; vol. 5703, No. 1.

Airola et al; Second-Harmonic Generation from an Array of Subwavelength Metal Apertures; Second-Harmonic Generation from Subwavelength Metal Apertures; Journal of Optics. A; Feb. 1, 2005; pp. S118-S123; vol. 7, No. 2.

Tang et al; C-Shaped Nanoaperture-Enhanced Germanium Photodetector; Optics Letters; posted online Feb. 16, 2012; pp. 1519-1521; vol. 31, No. 10.

K. Koerkamp et al.; Strong Influence of Hole Shaped on Extraordinary Transmission Through Periodic Arrays of Subwavelength Holes; Physical Review Letters; May 1, 2004; vol. 92, No. 18.

Heybel et al; Crucial Role of the Adhesion Layer of the Plasmonic Fluorescence Enhancement; ACS Nano; 2009; pates 2043-2048; vol. 3, No. 7.

U.S. Appl. No. 12/793,883, filed Jun. 4, 2010; Steven M. Blair; office action issued Apr. 5, 2012.

Bishop et al.; Competitive Displacemtn of DNA during Surface Hybridization; Biophy. J.; Jan. 2007; pp. L10-L12; vol. 91, No. 1.

Bishop et al.; A Competitive Kinetic Model of Nucleic Acid Surface Hybridization in the Presence of Point Mutants; Biophys. J.; 2006; pp. 831-840; vol. 90.

U.S. Appl. No. 12/042,516, filed Mar. 5, 2008; Steven M. Blair; office action dated Oct. 9, 2012.

U.S. Appl. No. 12/793,883, filed Jun. 4, 2010; Steven M. Blair; office action dated Nov. 9, 2012.

U.S. Appl. No. 12/191,134; filed Aug. 13, 2008; Alexander Chagovetz; office action dated Jul. 3, 2013.

* cited by examiner

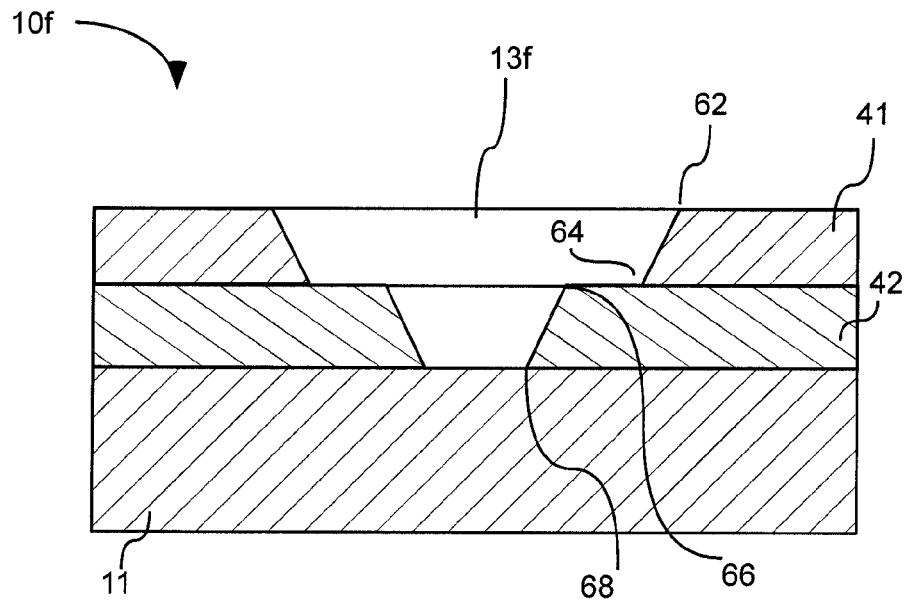
Fig. 7
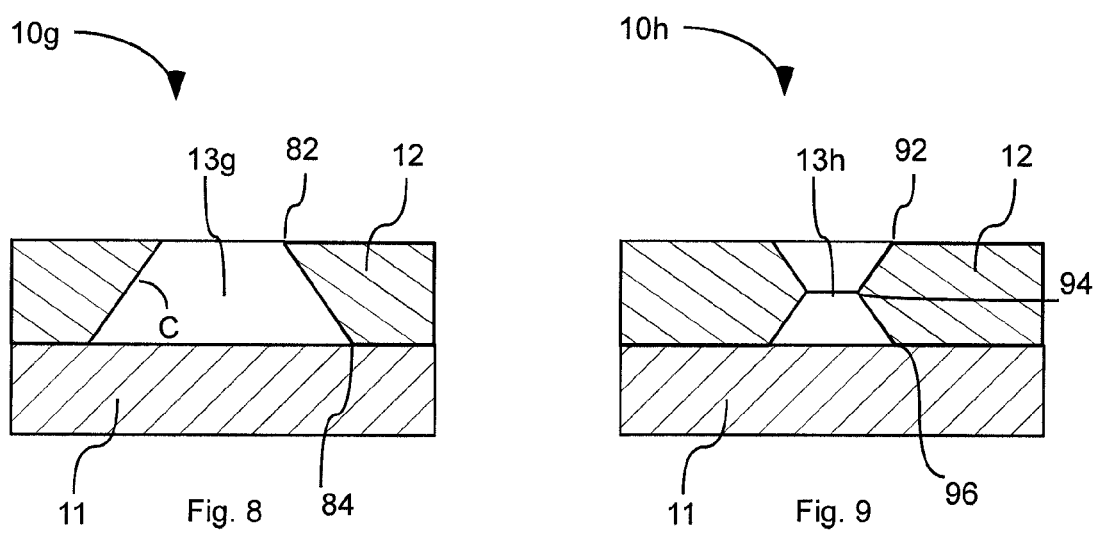
Fig. 8
Fig. 9

SUB-WAVELENGTH METALLIC APERTURES AS LIGHT ENHANCEMENT DEVICES

CLAIM OF PRIORITY

Priority of U.S. Provisional Patent Application Ser. No. 61/114,322, filed on Nov. 13, 2008 is claimed; and is herein incorporated by reference.

Priority of U.S. Provisional Patent Application Ser. No. 61/169,113, filed on Apr. 14, 2009 is claimed; and is herein incorporated by reference.

Priority of U.S. Provisional Patent Application Ser. No. 61/177,891, filed on May 13, 2009, is claimed; and is herein incorporated by reference.

This application is also a continuation-in-part of U.S. patent application Ser. No. 11/497,581, filed on Aug. 2, 2006, which claims the benefit of U.S. Provisional Patent Application Ser. No. 60/705,216 filed on Aug. 2, 2005, and the benefit of U.S. Provisional Patent Application Ser. No. 60/795,110 filed on Apr. 26, 2006.

BACKGROUND

It has been demonstrated that when illuminated with light, metallic cavity arrays support extraordinary transmission with resonances at specific frequencies, which are strongly related to the cavity array periodicity. See T. W. Ebbesen, H. J. Lezec, H. F. Gaemi, T. Thio, and P. A. Wolff, "Extraordinary optical transmission through sub-wavelength cavity arrays," Nature (London) 391, 667 (1998). Several models have been suggested to describe this phenomenon. See L. Martin-Moreno, F. J. Garcia-Vidal, H. J. Lezec, K. M. Pellerin, T. Thio, J. B. Pendry, and T. W. Ebbesen, "Theory of Extraordinary Optical Transmission through Subwavelength Cavity Arrays," Phys. Rev. Lett. 86, 1114 (2001); C. Genet, M. P. van Exter, J. P. Woerdman, "Fano-type interpretation of red shifts and red tails in cavity array transmission spectra," Opt. Commun. 225, 331 (2003); and H. J. Lezec, T. Thio, "Diffracted evanescent wave model for enhanced and suppressed optical transmission through subwavelength cavity arrays," Opt. Exp. 12, 3629 (2004). Most of these invoke the role of surface plasmon polaritons (SPPs). SPPs are surface electromagnetic waves formed by collective oscillation of electrons at a metal-dielectric interface. See H. Raether, *Surface Plasmons on Smooth and Rough Surfaces and on Gratings*, (Springer-Verlag, Berlin, 1988). These models indicate that the extraordinary transmission occurs when the incident excitation matches the surface plasmon resonances. The light is strongly localized on subwavelength scales as plasmonic excitations and a resonance effect is accompanied by field enhancement.

One of the main possible areas of use for such metallic cavity arrays is in the microarray diagnostic technologies. The substrates generally used in a microarray platform consist of an array of microscopic spots of immobilized DNA oligonucleotides, peptides, or proteins. The complementary or desired sequence of another molecule, such as ssDNA attached or tagged with a fluorescent molecule (often with absorption maxima at 488 nm, 532 nm and 635 nm) hybridizes to complementary probes on the substrate. After the hybridization reaction these substrates are excited by laser sources corresponding to the fluorescent molecules used, and fluorescence intensity is read or scanned with a microarray scanner. The concentrations of DNA oligomers immobilized on such substrates are typically in the nanomolar to picomolar ranges. The metallic cavity arrays under illumination redistribute light inside the cavities through the excitation of surface plasmons thereby increasing the local intensity. By immobilizing the DNA oligonucleotides inside the cavities and using them as tiny reaction chambers for hybridization, it is possible to take advantage of the local intensity enhancements for improving the emitted fluorescence intensity. See M. J. Heller, "DNA microarray technologies: Devices, systems and applications," Annu. Rev. Biomed. Eng., 4, 129 (2002); Y. Liu, F Mandavi, and S. Blair "Enhanced Fluorescence Transduction Properties of Metallic cavity Arrays," IEEE J. Selected Topics in Quantum Electronic 11, 778 (2005); and S. Fore, Y, Yuen, L. Hesselink, T. Huser, "Pulsed-interleaved excitation FRET measurements on single duplex DNA molecules inside C-shaped cavities" Nano. Lett. 7 1749 (2007).

However, many conventional metallic cavity arrays are limited in the ability to control or tune the enhancement in light transmission through the cavities and/or light intensity within the cavities. As a result, the sensitivity, accuracy, and specificity of assays using such cavity arrays is limited.

SUMMARY

Provided herein are light enhancement devices, applications for the light enhancement devices, and methods for making the light enhancement devices. The disclosed light enhancement devices include a substrate and a film of metal disposed over the substrate, the film of metal including at least one cavity. The present invention is based, in part, upon the inventors' discovery that by adjusting the angle of the sidewall of the cavity with respect to a surface normal to the substrate, it is possible to achieve an enhancement of the transmission of light through the cavity, an enhancement of the intensity of light within the cavity, or both, than the enhancement if the sidewall of the cavity was straight. Large enhancement factors, including enhancement factors of 15 or more, may be achieved for specific ranges of sidewall angles. As a result, light enhancement devices including the disclosed cavities are capable of providing significantly more sensitive, accurate, and specific bioassays as compared to conventional light enhancement devices.

In addition to an angled sidewall, further enhancement of the transmission of light through the cavity can be obtained by including one or more changes in the sidewall within the cavity, including a change in angle, a change in material, a change in width, or a combination thereof. In addition, further enhancement of the transmission of light through the cavity may be obtained through creation of additional nodes. In this application, a "node" means a location in the film of metal where the angle of the sidewall of the cavity with respect to a surface of the substrate is substantially changed. For example, the cavity of FIG. 1 has two nodes at locations 14 and 16. As another example, the cavity of FIG. 2 has three nodes at locations 22, 24 and 26. The spacing between the nodes and the width of the cavity at each node may also be adjusted to allow tuning the cavity to multiple or different wavelengths of incoming light.

The shape and dimensions of the cavities may vary. In some embodiments, the cavity is in the shape of a truncated cone, although other shapes are possible. The dimensions of the cavities may be on the nanometer scale.

Light enhancement devices including a plurality of any of the disclosed cavities in the metallic film are also provided. In some embodiments, the plurality of cavities may be arranged in a periodic array. The shape, dimensions, and the magnitude of the angle of a tapered sidewall of the cavities within such arrays may be the same or different from one another. The light enhancement devices may be used with a variety of wavelengths of light.

In another aspect, applications involving any of the disclosed light enhancement devices are provided. In some embodiments, the light enhancement devices may comprise at least one biomolecule disposed in the cavity and may be used as biosensors. This non-limiting application is further described below. Light enhancement devices including a passivation layer disposed over the metallic film in order to prevent the adsorption of molecules of interest to the metallic film are also described, as are methods for forming such light enhancement devices.

In yet another aspect, methods for making any of the disclosed light enhancement devices are provided. The methods involve forming a film of metal over a substrate and forming at least one cavity in the film of metal. Techniques for forming the film of metal and forming the cavities are provided herein.

BRIEF DESCRIPTION OF THE DRAWINGS

FIG. 7 is a cross-sectional view of a light-enhancement device.
FIG. 8 is a cross-sectional view of a light-enhancement device.
FIG. 9 is a cross-sectional view of a light-enhancement device.

DETAILED DESCRIPTION

Provided herein are light enhancement devices, applications for the light enhancement devices, how to make light enhancement devices, and working examples.

Light Enhancement Devices

Figure 1:
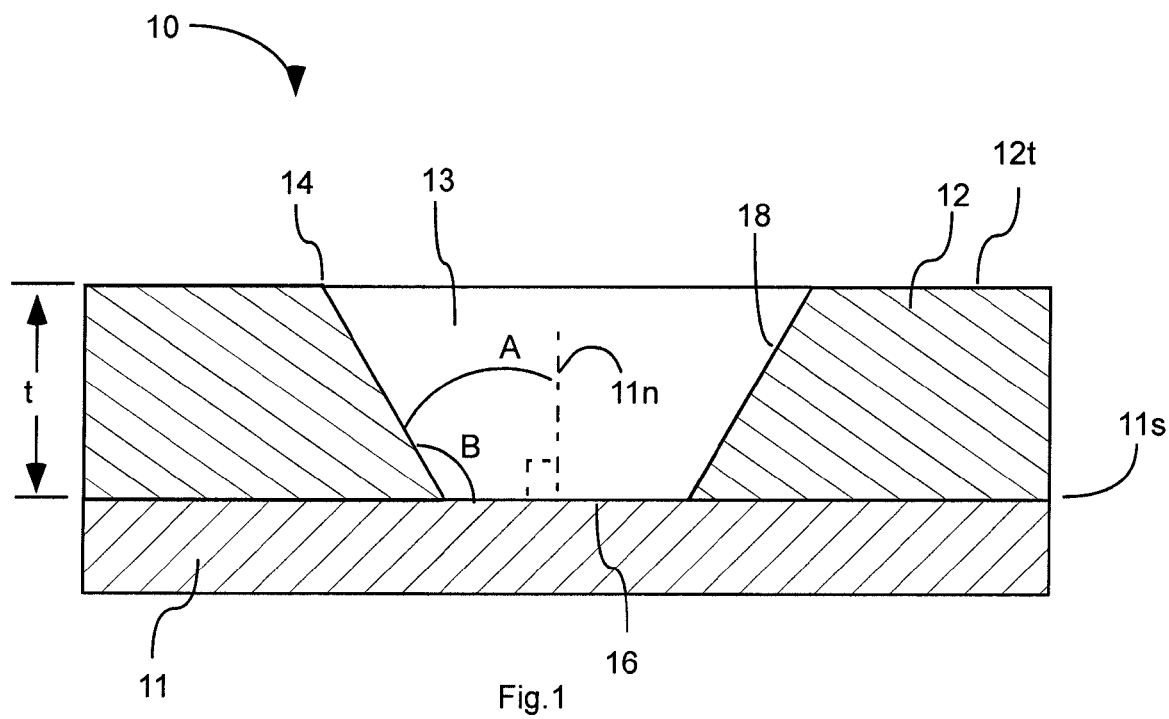
FIG. 1 is a cross-sectional view of a light-enhancement device.

The light enhancement devices include a substrate and a film of metal disposed over the substrate, the film of metal including at least one cavity or nanoaperture. By "cavity," it is meant an opening having dimensions on the nanometer scale that extends through the metallic film, exposing the underlying substrate. A non-limiting exemplary light enhancement device 10 is shown in FIG. 1. The light enhancement device 10 includes a substrate 11 and a film of metal 12 disposed over the substrate, the film of metal including a cavity 13. The metallic layer 12 can be any conductive pure metal, metallic alloy, or metallic compound. In all embodiments, layer 12 can be a single material or multiple layers of different materials. The substrate 11 can be any dielectric material and can be a single material or multiple layers of different materials.

As shown in FIG. 1, the cavity 13 includes a tapered sidewall 18 characterized by an angle A of approximately 30° with respect to a surface normal 11n to the substrate 11 (or an angle B of approximately 120° with respect to the surface 11s of the substrate). Thus, the cavity 13 has a sidewall 18 that is non-parallel with respect to the surface normal 11n to the substrate, or that is non-orthogonal to the surface 11s of the substrate. In some of the disclosed cavities, the angle with respect to a surface normal 11n to the substrate 11 is sufficiently different from 0° to provide an enhancement of the transmission of light through the cavity, the intensity of light within the cavity, or both, that is greater if the angle was 0°. The cavity 13 has a shape of a truncated cone or frustum.

The cavity 13 of FIG. 1 has a continuous change in width along a depth of the cavity. In addition, the cavity 13 of FIG. 1 has two nodes 14 and 16. A light enhancement or resonance of electromagnetic waves, such as visible light, can be created in the cavity between and/or at the nodes 14 and 16, and between the sidewall 18. The spacing between nodes will typically be less than the wavelength of the electromagnetic waves used. For example, if visible light is used, then the distance between nodes may be less than about 400 nm. For infrared, the distance between nodes may be less than about 1 mm. In this patent application, for simplicity, the term "light" will be used for electromagnetic waves of any wavelength, including visible light.

The resonance created results in an amplification of the light transmitted through the cavity. One practical use of the surface plasmon resonance effect is in identification or quantification of a chemical sample, such as at least one biomolecule. A chemical in the cavity can absorb the light and fluoresce the light at a different wavelength than the incoming light. A comparison of the amplitude and/or wavelength of light transmitted without the chemical in the cavity to the amplitude and/or wavelength of light transmitted with the chemical in the cavity can allow determination of whether a specific chemical is present and in what quantity.

Multiple factors may be changed to affect the output light signal, such as the thickness of the metal, the type of metal, the shape of the hole or cavity, the shape of the nodes or corners (blunt corner or rounded edge), and the wavelength of light. Any or all of these factors may be adjusted to obtain the optimal signal amplification for ease in identification or quantification of the specific chemical placed in the cavity.

The dimensions of the cavities may vary. The cavities may be defined by a top width, a bottom width, widths at each node within the cavity, and a depth. Top width means the width of the cavity at the top surface of the metallic film. Bottom width means the width of the cavity at the bottom surface of the metallic film (which is also the interface of the metallic film and the substrate). The depth of the cavity may be determined by the thickness (labeled "t" in FIG. 1) of the metallic film. Each of these dimensions may vary. In some embodiments, such as the embodiment of FIG. 1, the top width is greater than the bottom width. In other embodiments, the top width may be less than the bottom width (as in FIG. 8). The thickness of the film may also vary. Experiments have been performed with thicknesses varying between 50 nm to about 500 nm. If a film is made up of multiple layers, each layer may have a thickness of around 500 nm or less. In some applications, thicknesses of greater than 500 nm may be desirable.

The surface characteristics of the metallic film may vary. In some embodiments, the top surface of the metallic film, e.g. element 12t in FIG. 1, is substantially flat. By "substantially flat" it is meant that the top surface of the metallic film is flat, but not necessarily perfectly flat. In such embodiments, the top surface of the metallic film does not comprise any surface features, such as raised or depressed regions in the form of protrusions, dimples, grooves, ribs, corrugations, etc., on the surface of the metallic film. However, in other embodiments, the top surface of the metallic film may comprise such surface features or similar such features.

A variety of metals or metal alloys may be used to form the metallic films. The film of metal may include two or more layers of metal. The film of metal may also include layers of dielectric material. Because the enhancement of the transmission of light through the cavity and the intensity of light within the cavity may vary depending upon the choice of metal, and whether layers of dielectric are included, multilayer films provide the ability to tune these enhancement effects as desired.

Similarly, the composition of the substrate may vary. In some embodiments, the substrate comprises a transparent material. A variety of transparent materials may be used, including but not limited to glass, quartz, silicon, fused silica, or optical plastics. Silicon is particularly suitable for infrared wavelengths of light.

In some embodiments, the light enhancement devices include a plurality of cavities disposed in the metallic film. The plurality of cavities may be randomly distributed throughout the metallic film or may be arranged in a periodic array. For periodic arrays, the periodicity (the distance between the centers of adjacent cavities) may vary. In some embodiments, the periodicity is about 200 nm. In other embodiments, the periodicity is about 300 nm, about 400 nm, about 500 nm, or about 600 nm. However, other periodicities are possible. The patterns formed by the periodic array may vary. Non-limiting examples of patterns include square arrays, rectangular arrays, triangular arrays, and hexagonal arrays. In the arrays, the shape, dimensions, and the magnitude of the angle of a tapered sidewall of one cavity may be the same or different as the shape, dimensions, and the magnitude of the angle of a tapered sidewall of another cavity in the array. In some embodiments, the shape, dimensions, and the magnitude of the angle of a tapered sidewall of one cavity are substantially the same as each of these characteristics of another cavity in the array.

The disclosed light enhancement devices having cavities with tapered sidewalls and/or non-linear sidewalls are capable of enhancing the transmission of light through the cavities; enhancing the intensity of light within the cavities; or both; as compared to light enhancement devices having cavities with straight sidewalls orthogonal to the surface of the substrate. The enhancement factors may vary depending upon the angle of the tapered sidewall. By "enhancement factor" it is meant the factor by which the light transmission through, or the light intensity within, the cavity having tapered sidewalls is increased over the transmission through, or intensity within, a cavity having straight sidewalls. Other variables may affect the enhancement factor, including, but not limited to the dimensions of the cavity, the periodicity of the cavities within an array of cavities; the type of metal(s) used in the metallic film, the wavelength of light illuminating the cavity, and whether the illumination is above the metallic film through the air or below the metallic film through the substrate. However, enhancement factors as high as 15 have been observed in some of the disclosed light enhancement devices.

Figure 2:
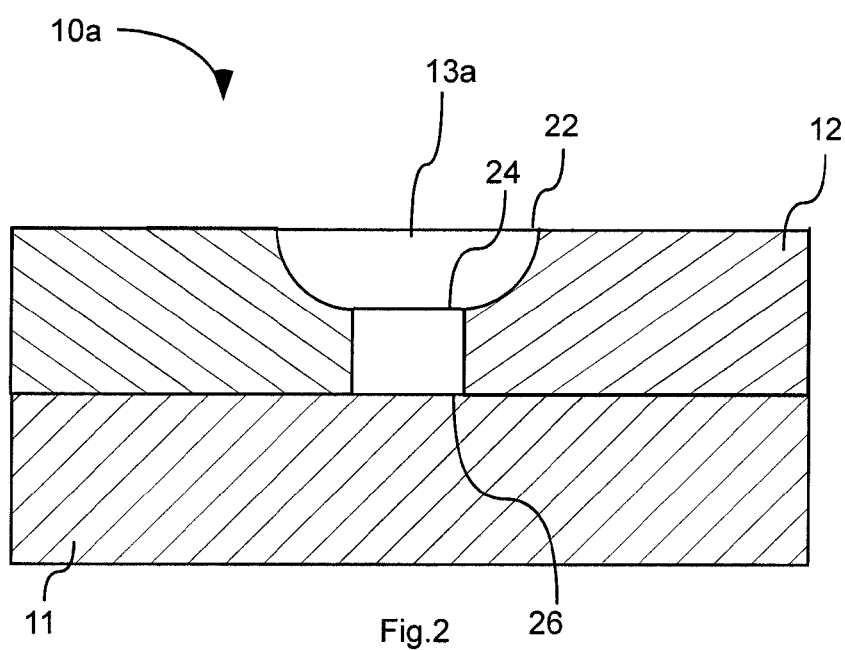
FIG. 2 is a cross-sectional view of a light-enhancement device.

As shown in FIG. 2, a cavity 13a or sidewall of another light enhancement device 10a can have a change 24 in width, a change in angle, or both, so that at least a portion of the sidewall of the cavity is non-linear and non-orthogonal to the surface of the substrate. The change in the sidewall can be distinct and can divide the cavity into one or more different portions with different characteristics, such as different shapes, different widths, different depths, different materials, different volumes, different angular sidewalls, or combinations thereof. The light can react differently, or different wavelengths of light can react differently, in the different portions due to the different characteristics. In addition, the cavity 13a can have three nodes 22, 24 and 26. The cavity 13a can include an enlarged portion, or greater diameter, at the upper surface of the metallic layer 12, and a reduced portion, or lesser diameter, at the substrate 11. In addition, the enlarged portion of the cavity 13a can include curved or arcuate walls. There can be resonance at or between the nodes 22, 24 and 26. The distance between the nodes and the width of the cavity or portions can be adjusted to match a specific wavelength of light. Note that the widths of the two portions are different. If this difference in widths is sufficient, the resonance between the portions can occur at a different wavelengths. This resonance at multiple wavelengths can be helpful in identifying a specific chemical compound. For example, the width of the upper portion can be designed for resonance with one specific chemical subgroup and the width of the lower portion can be designed for resonance with a different specific chemical subgroup of the chemical one is seeking to identify.

The width of the lower portion can be constant, or cylindrical as in FIG. 2. With constant width, the resonance will be amplified. Increased amplification at a specific wavelength can result in a larger light signal that is easier to quantify. The distance between nodes 24 and 26, or depth of the lower portion, can be the same as or different than the width of the upper portion or the width of the lower portion. With more nodes or widths having equal distances, the signal has more amplification. With more nodes or widths of different distances, resonance will occur at more wavelengths. This may be useful in identifying a specific chemical in the cavity, especially if that chemical is very complex, with multiple different chemical functional groups. Cavity design is selected to optimize the desired use of the cavity.

Figure 3:
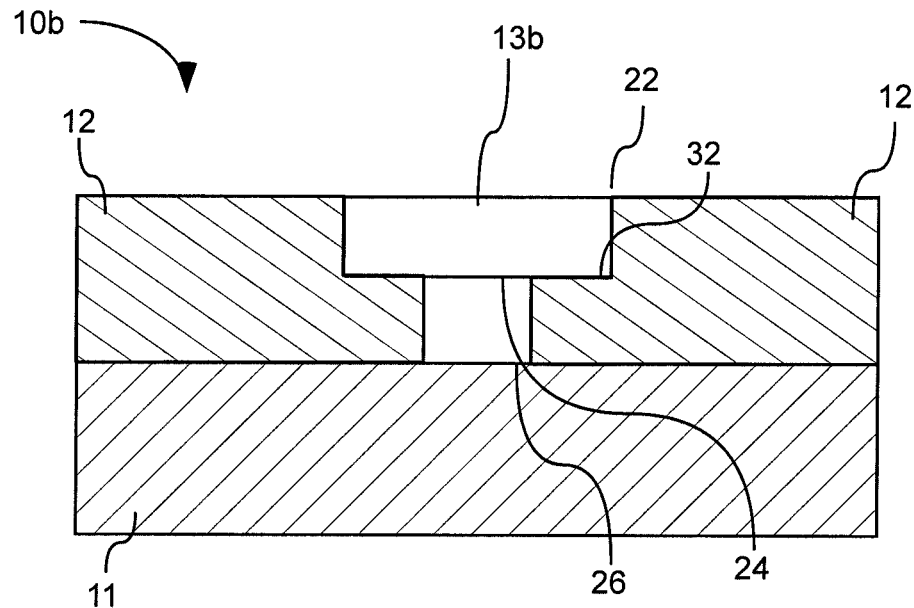
FIG. 3 is a cross-sectional view of a light-enhancement device.

Cavity 13b of another light enhancement device 10b of FIG. 3 has another node 32, than cavity 13a of FIG. 2, and has a difference in width and two changes in angle. Depending on the width at node 32 and adjacent nodes, these nodes can aid in signal amplification or in allowing resonance to occur at different wavelengths. The cavity 13b can have a stepped cross-section with an upper enlarged or greater diameter portion and a lower reduced or lesser diameter portion.

Figure 4:
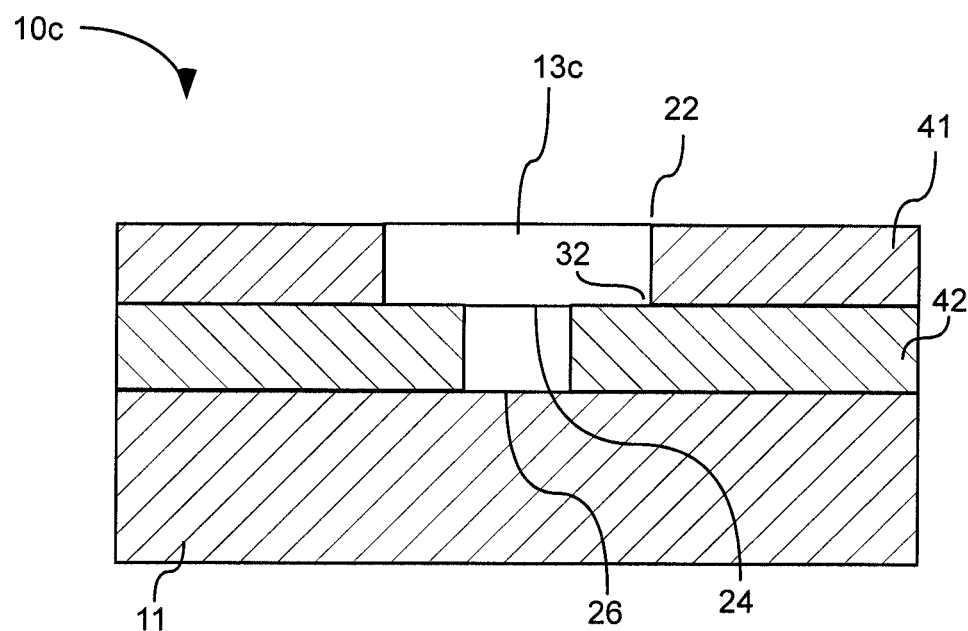
FIG. 4 is a cross-sectional view of a light-enhancement device.

Cavity 13c of another light enhancement device 10c of FIG. 4 has the same node structure as cavity 13b of FIG. 3, but is manufactured of multiple metallic materials, 41 and 42. Similar to metallic materials 12 discussed previously, metallic materials 41 and 42 can be pure metals, metallic alloys, or metallic compounds and each layer 41 or 42 can be a single material or layers of different materials. In addition, cavity 13c has a change in width, a change in material or layers, and two changes in angle.

Figure 5:
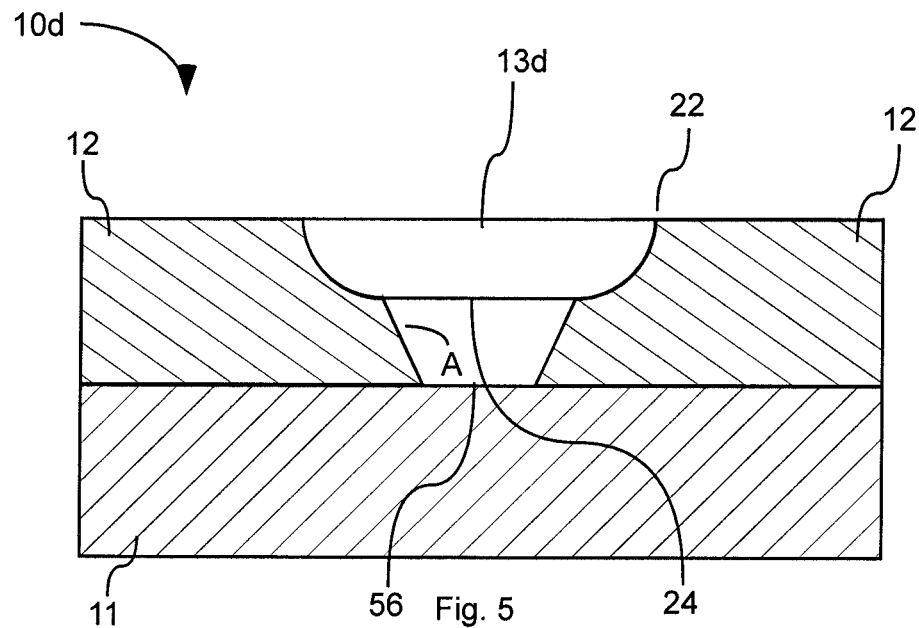
FIG. 5 is a cross-sectional view of a light-enhancement device.

An alternative structure, for providing more differences between nodes and widths, and thus more wavelengths at which resonance can occur, is shown in cavity 13d of another light enhancement device 10d of FIG. 5. Angle A in cavity 13d is greater than ninety degrees, as compared with an angle approximately equal to ninety degrees at a similar location in cavity 13a of FIG. 2. This results in a different width of the lower portion. Thus, the walls of the cavity 13d can be angled or inclined, and can be curved or arcuate in cross-section. A lower portion of the cavity 13d can have an inverted frusto-conical shape. In addition, cavity 13d has a change in width, and two changes in angle.

Figure 6:
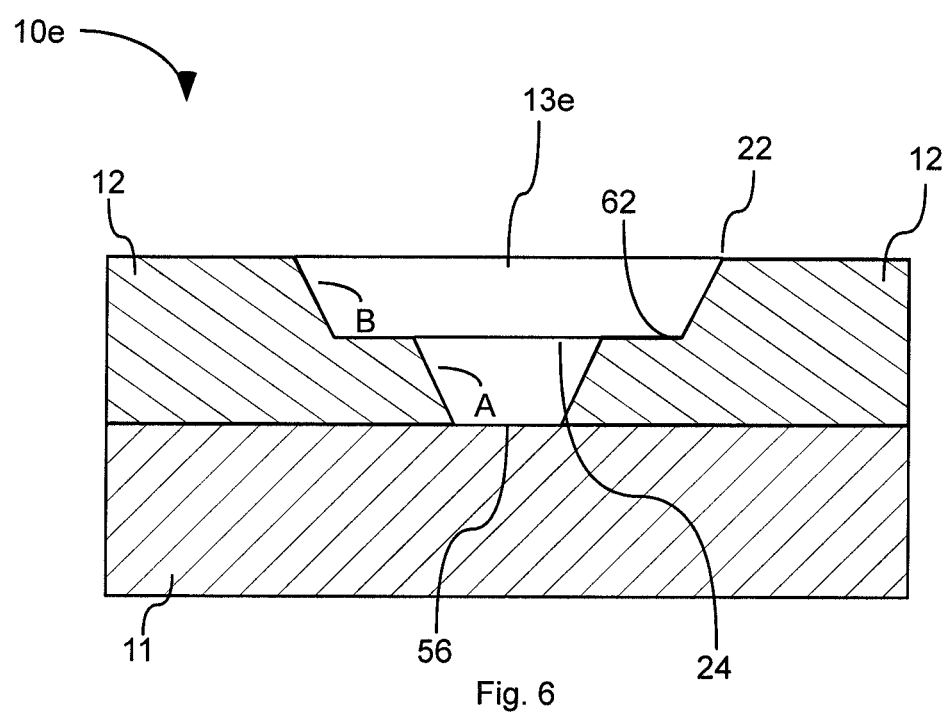
FIG. 6 is a cross-sectional view of a light-enhancement device.

The difference between cavity 13d of another light enhancement device 10d of FIG. 5 and cavity 13e of another light enhancement device 10e of FIG. 6 is similar to the difference between cavity 13a of FIG. 2 and cavity 13b of FIG. 3. Cavity 13d has a change 24 in width, and a change 24 in angle. The change 24 divides the cavity into an upper portion with curved sidewall and a lower portion with angled sidewall. Cavity 13e has two changes 24 and 62 in width and angle dividing the cavity into an upper truncated cone and a lower truncated cone, both with angled sidewalls. Cavity 13d has three nodes 22, 24 and 56; while cavity 13e has three nodes 22, 62, 24 and 56. In the cavity 13e, the curved shape of the sidewall, between nodes 22 and 24 has been replaced by a corner, resulting in additional node 62 in cavity 13e. Depending on the spacing between these nodes and other nodes in cavity 13e, additional node 62 may result in increased wavelength amplification or they may result in a new wavelength at which resonance can occur. Differences between cavity 13b in FIG. 3 and cavity 13e in FIG. 6 are angles A and B, which are greater than zero with respect to the surface normal or greater than ninety degrees with respect to the surface. Thus, the cavity 13e can have an upper inverted frusto-conical shape larger than a lower inverted frusto-conical shape. Cavity 13f of another light enhancement device 10f of FIG. 7 is similar to cavity 13e with the difference that metallic layer 12 has been divided into at least two different metallic layers 41 and 42. Thus, cavity 13f also has a change of material.

In cavity 13g of another light enhancement device 10g of FIG. 8, the width of the cavity at the top or opening is different from the width of the cavity at the bottom, due to angled sidewall of the cavity which has an angle C greater than zero with respect to the surface normal or an angle C greater than ninety degrees with respect to the surface of the substrate. As discussed previously, this may allow resonance at an additional wavelength. A diameter of the cavity 13g at the substrate can be larger than a diameter of the cavity at the upper surface of the metallic layer, resulting in a truncated cone shape. In addition, the cavity has two nodes 82 and 84.

There are three nodes 92, 94 and 96 in the hourglass-shaped cavity 13h of another light enhancement device 10h of FIG. 9. The cavity 13h has a change 94 in width and a change 94 in angle dividing the cavity into two truncated cones of opposite orientation. The width of a midpoint of the cavity is less than the width of the cavity at the top and the bottom, resulting in the hourglass shape. The width of the top and bottom can be the same or different. The metallic layer 12 of FIG. 9 can be divided into multiple metallic layers 101 and 102 as shown in the cavity 13i of another light enhancement device 10i of FIG. 10. Thus, cavity 13i also has a change in material.

Figure 11:
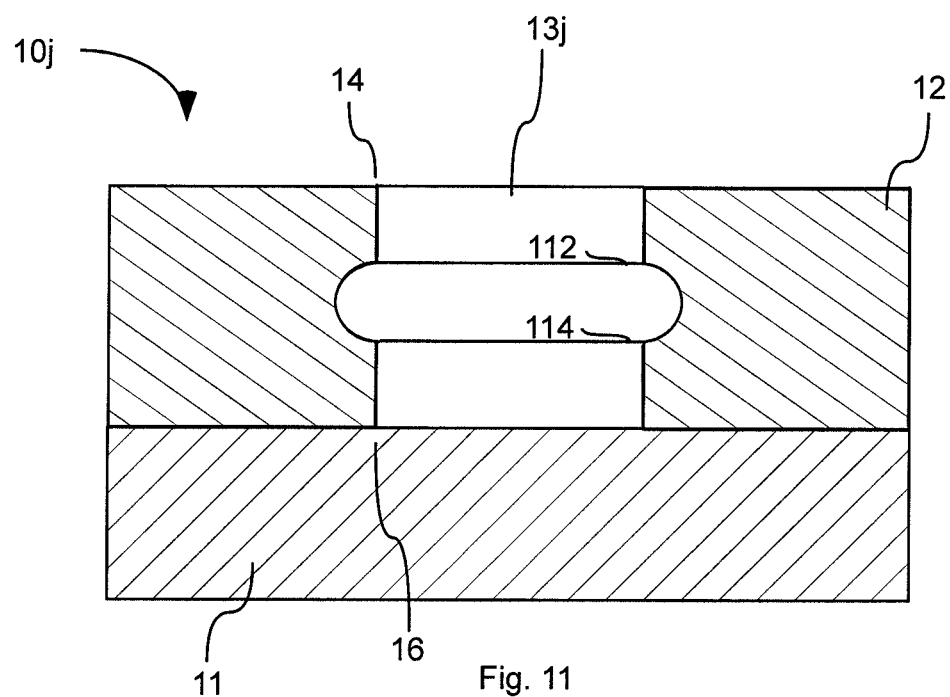
FIG. 11 is a cross-sectional view of a light-enhancement device.
Figure 12:
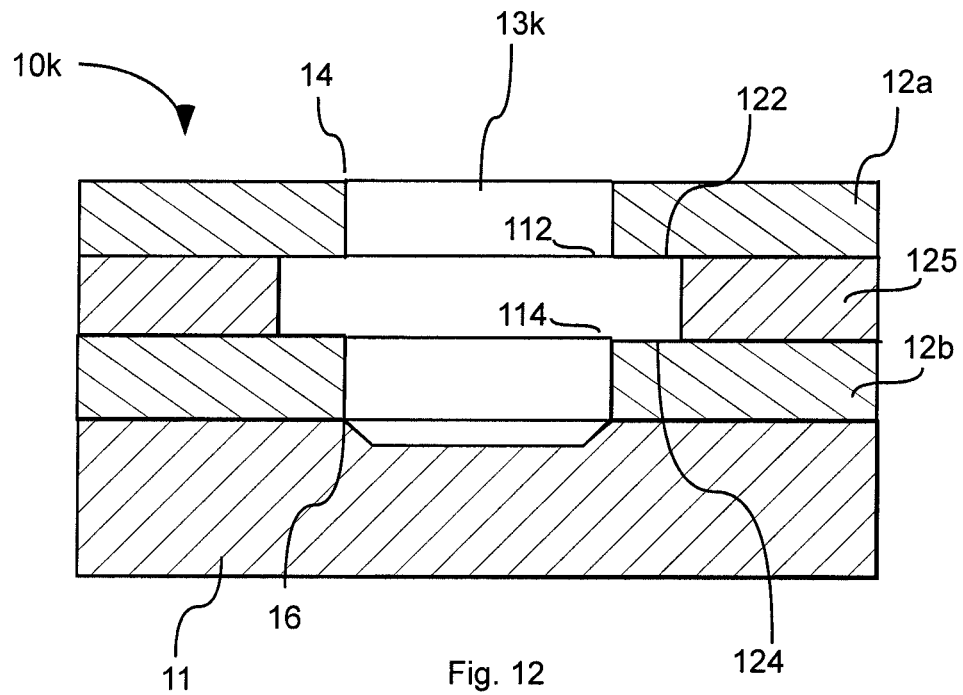
FIG. 12 is a cross-sectional view of a light-enhancement device.

Cavity 13j of another light enhancement device 10j of FIG. 11 has four nodes 14, 112, 114, and 16, allowing more resonance. In addition, the cavity has two changes 112 and 114 in angle and width dividing the cavity into upper and lower cylindrical portions with an annular groove section therebetween. The cavity 13j includes an annular groove formed in the cylindrical wall of the cavity intermediate the top and bottom of the cavity. Thus, the sidewall of the cavity is non-linear. The sidewall of the groove can be curved, as shown. In FIG. 12, cavity 13k of another light enhancement device 10k has two more nodes 122 and 124 than cavity 13j. Due to the curved cavity walls of the groove in the cavity 13j of FIG. 11, between nodes 112 and 114, cavity 13j of FIG. 11 does not have nodes 122 and 124, which are present in cavity 13k of FIG. 12. The structure in FIG. 12 has a dielectric layer 125 between metallic layers 12a and 12b. Metallic layers 12a and 12b may be the same material or they may be different materials, and can be pure metals, metallic alloys, or metallic compounds. In addition to more nodes for resonance in cavity 13k, the dielectric layer 125 can act as a wave guide. The thicknesses of the metallic layers 12a and 12b and the dielectric layer 125 can be modified to adjust spacing between nodes in order to match the desired wavelength(s) for optimal resonance. The cavity in the middle or dielectric layer 125 can be larger, or have a greater diameter, than the cavity in the metallic layers 12a and 12b. In addition, a portion of the cavity can be formed in the substrate 11. Thus, the cavity 13k has four changes 114, 124, 122 and 112 in angle, two or three changes in material, and two changes in width dividing the cavity into three different cylindrical shapes, and with a non-linear sidewall. In addition, the cavity 13k has six nodes 14, 112, 122, 124, 114 and 16.

Figure 13:
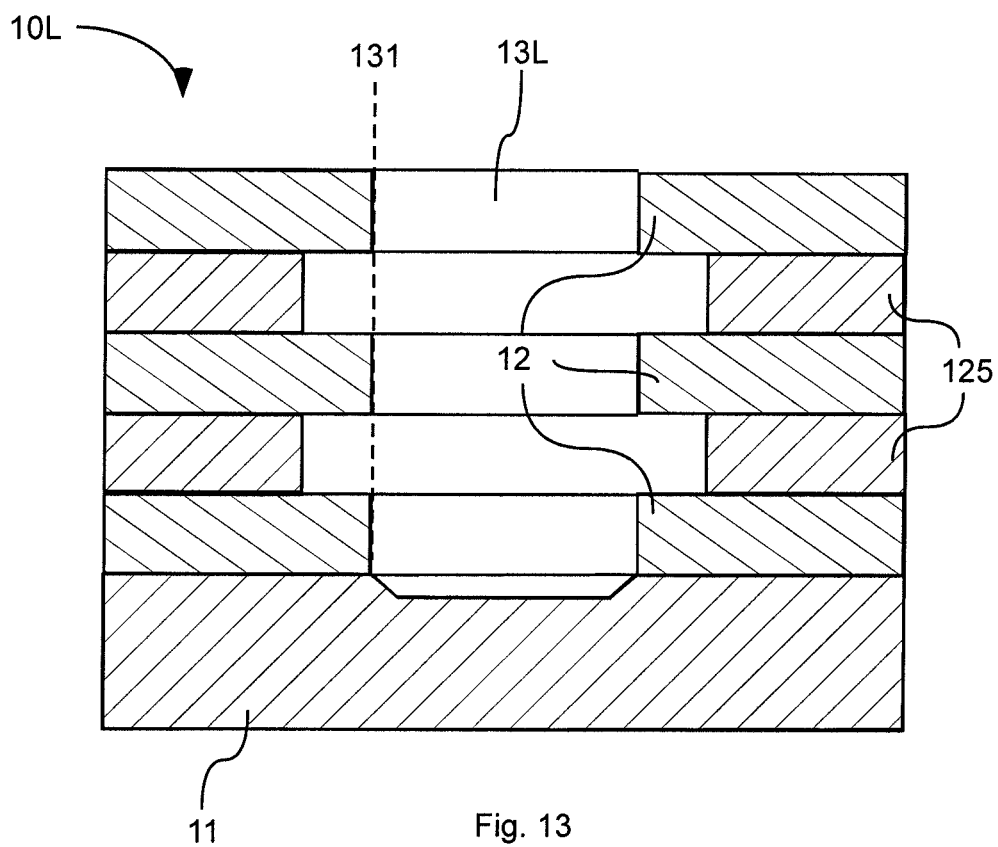
FIG. 13 is a cross-sectional view of a light-enhancement device.

In cavity 13L of another light enhancement device 10L of FIG. 13, there are at least three metallic layers 12 with a dielectric layer 125 between each metallic layer 12. All of the metallic layers 12 may be made of the same material or the different layers may be made of different materials. Similarly, all of the dielectric layers 125 may be made of the same material or the different layers may be made of different materials. More layers results in more nodes and increased resonance. Note that in FIG. 13, the metal layers 12 in the cavity 13L, align with the dashed line 131. Line 131 is perpendicular to the surface plane of the substrate 11.

Figure 14:
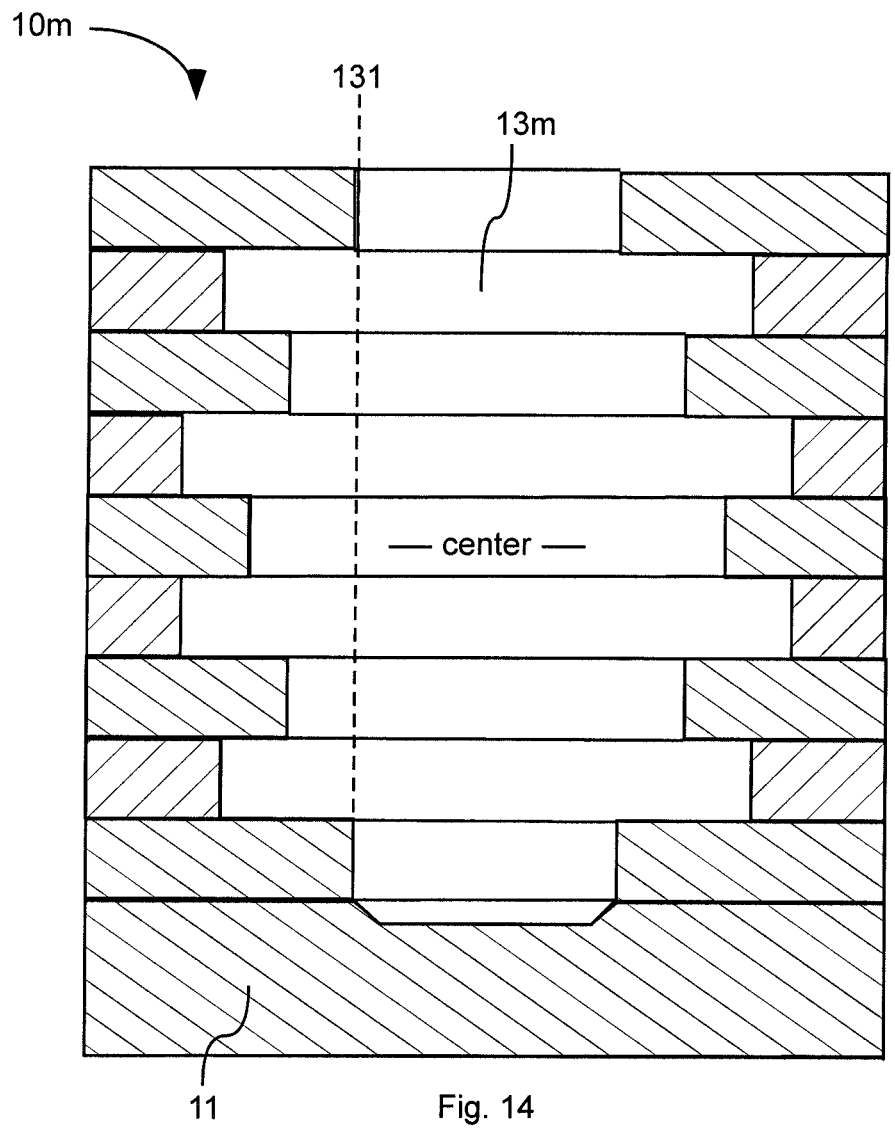
FIG. 14 is a cross-sectional view of a light-enhancement device.

Cavity 13m of another light enhancement device 10m of FIG. 14 is similar to cavity 13L with the exception that the metal layers are not in alignment with line 131. The cross-sectional shape of cavity 13m is circular or elliptical. Note that there are many different distances between nodes in this structure, allowing resonance at many different wavelengths. Many other shapes may also be made, such as the "V" shaped cavity 13n of another light enhancement device 10n of FIG. 15. Note the alignment of metal layers with "V" shaped line 151.

Figure 16:
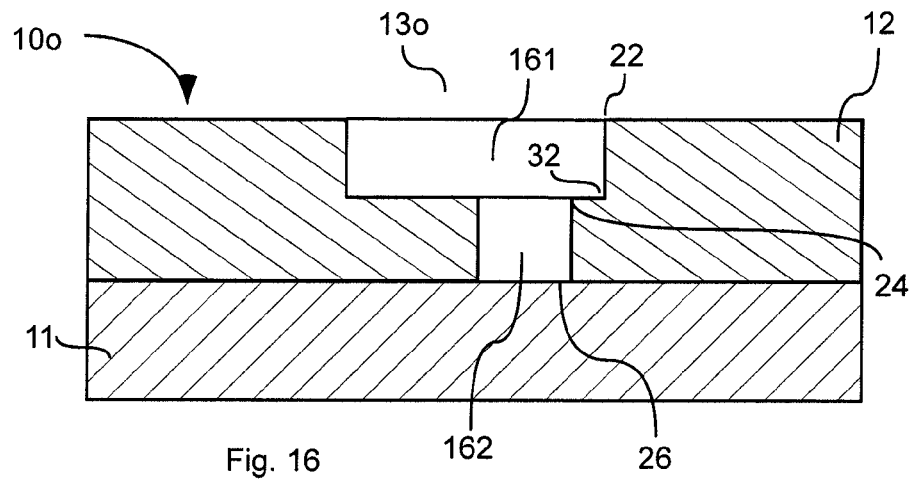
FIG. 16 is a cross-sectional view of a light-enhancement device.

Cavity 13o of another light enhancement device 10o in FIG. 16 shows a similar structure to 13b in FIG. 3. The lower portion 162 of the cavity 13o does not have to be centered or aligned under the upper portion 161 of the cavity. The cavity 13o has two changes 24 and 32 in angle and one change in width dividing the cavity into upper and lower portions that are not collinear, and with a sidewall that is non-linear. With lower cavity 162 off-center from upper cavity 161, there can be resonance at one wavelength between the nodes and resonance at a different wavelength between the nodes.

Figure 17:
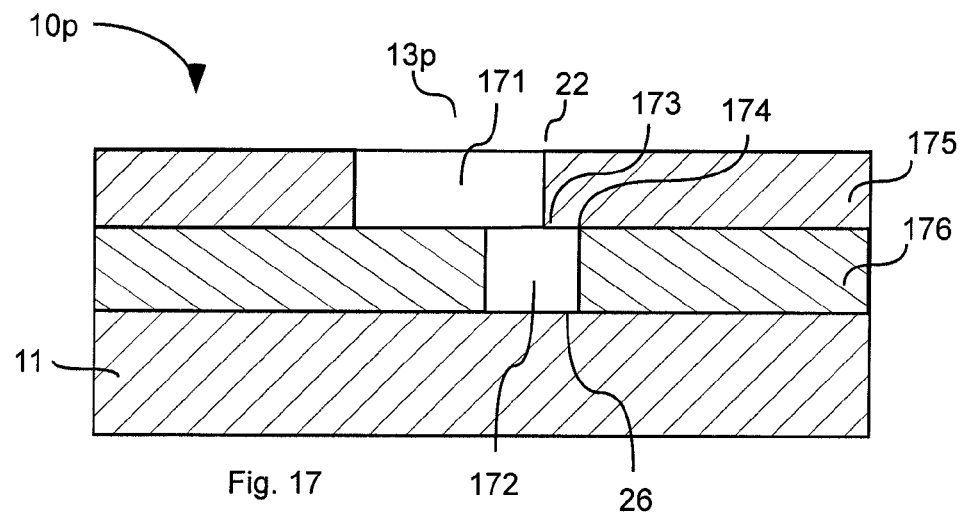
FIG. 17 is a cross-sectional view of a light-enhancement device.
Figure 18:
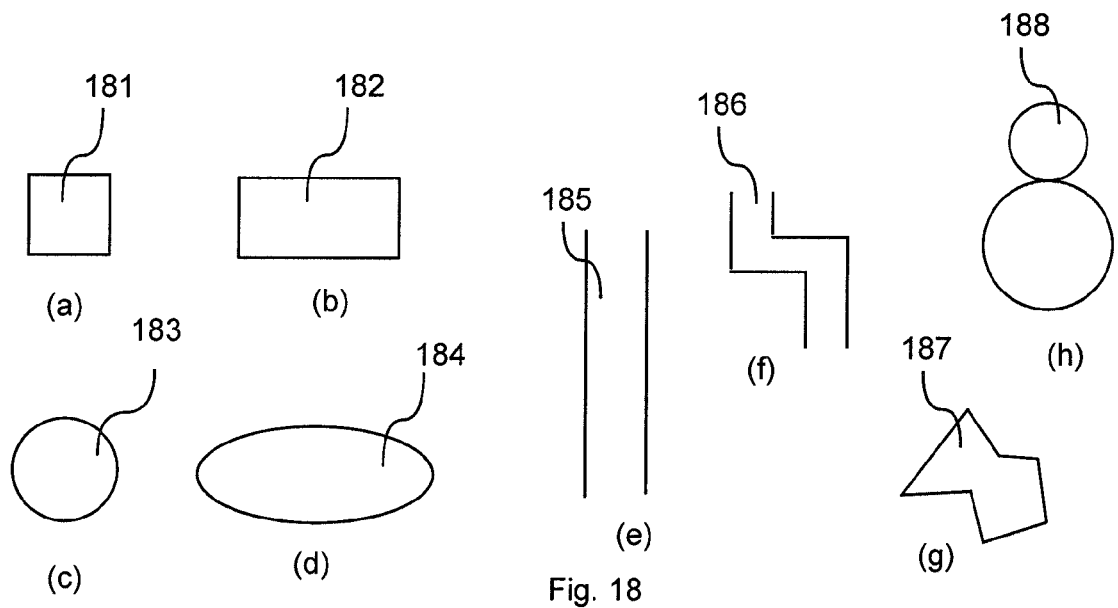
FIGS. 18a-h are top-views of various shapes of a light-enhancement devices.

The structure of another light enhancement device 10p of FIG. 17, like that of FIG. 16, is also non-symmetrical. This principle of non-symmetry can also be applied to other embodiments discussed previously. As in cavity 13o, the lower portion 172 of the cavity 10p does not have to be centered or aligned under the upper portion 171 of the cavity. The nodes in cavity 13p are situated differently than the nodes in cavity 13o. Note that in cavity 13p, node 173 hangs over or partially encloses the lower portion 172 of the cavity.

Figure 19:
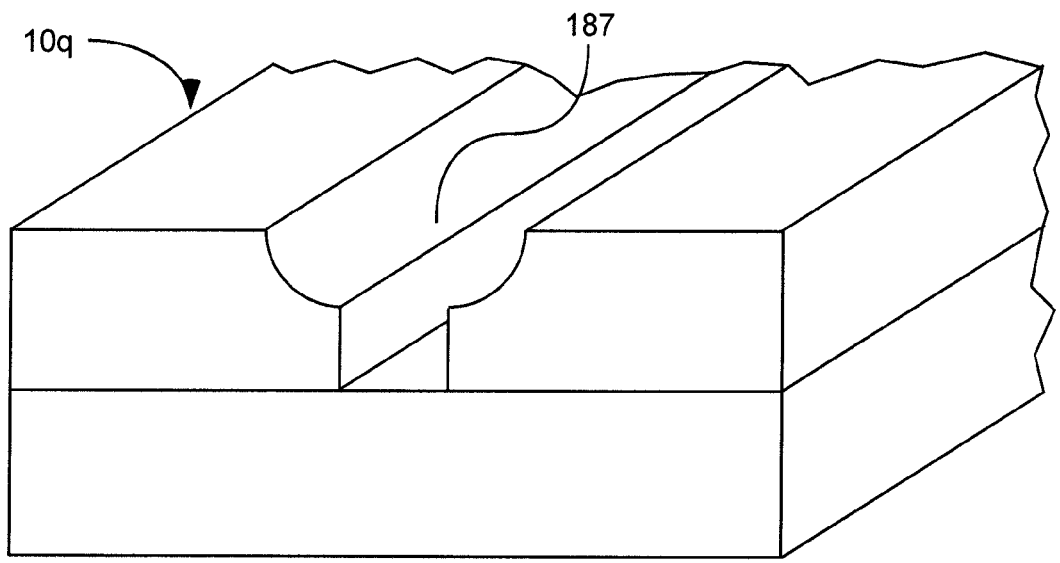
FIG. 19 is a cross-sectional view of a light-enhancement device.
Figure 20:
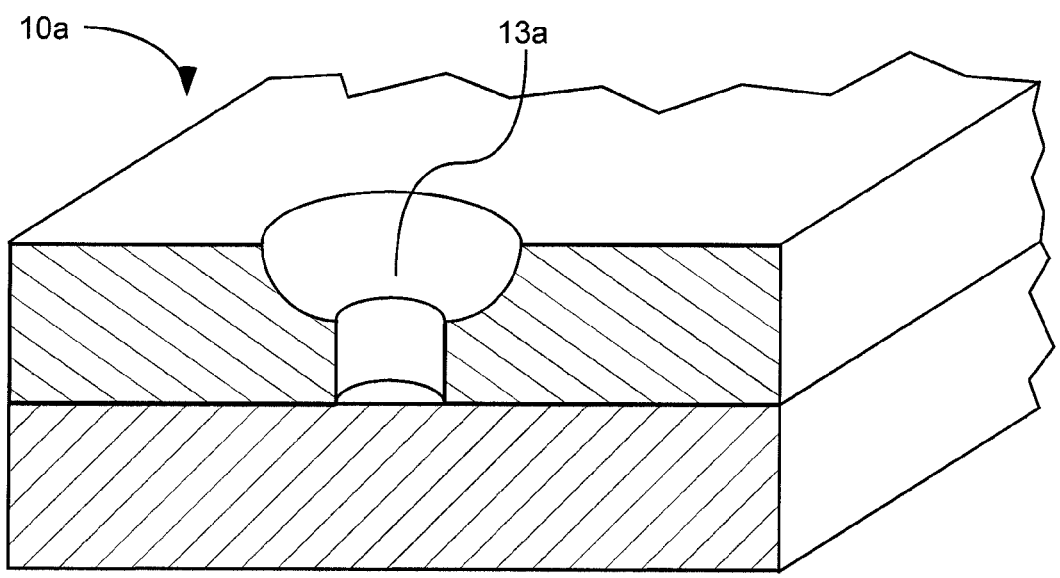
FIG. 20 is a cross-sectional view of a light-enhancement device.

As shown in FIG. 18a-h, the shape of a cavity, as seen looking down on the metal with the substrate beneath, can be various shapes, including square 181, rectangular 182, circular 183, elliptical 184, channel 185, a non-symmetrical shape 187, or a figure eight 188. Cavity, as used in this application, includes not only a pit or hole but also a channel. A channel 185 does not need to continue in a straight line, but can bend or curve, so that the channel shape, as seen from the surface of the metal, may form an L shape, an S shape, or any other desired shape or pattern, such as 186. For further clarification, a three dimensional view of a champagne glass-shaped cavity 187 as a channel of another light enhancement device 10q is shown in FIG. 19 and as a circular hole 13a in FIG. 20. All structures in this patent application may use any of the cavity shapes of FIG. 18. The pattern or mask designed or selected determines the cavity shape as seen looking down on the metal with the substrate beneath.

Applications

The disclosed light enhancement devices find use in a variety of applications. These applications are not particularly limited, but rather may be driven by the need for an increase in light transmission or light intensity. By way of example only, the light enhancement devices may find use in biological applications as biosensors. The basic principle underlying use of sub-wavelength metallic apertures as biosensors involves the detection of fluorescently labeled biomolecules within the cavities. Because the transmission of light through and the intensity of light within the disclosed cavities is greatly enhanced, the sensitivity, accuracy, and specificity of biosensors including the disclosed cavities is greatly improved over conventional biosensors. In addition, the ability to tune the enhancement of light transmission and light intensity by adjusting the angle of the tapered sidewall, the cavity shape, and other factors, for a particular wavelength of light is extremely useful as it allows a single biosensor to be used with a broader range of biomolecules and fluorescent molecules. Thus, in some embodiments, the disclosed light enhancement devices may further comprise at least one biomolecule disposed in the cavity. A variety of biomolecules may be used, including, but is not limited to DNA, RNA, or proteins. The light enhancement devices may further include any of the accessories necessary for biosensing such as delivery systems for supplying the biomolecules, light sources, and detectors. Exemplary biosensors, accessories, and methods for using the biosensors are disclosed in U.S. Ser. No.

11/497,581 and in International Publication Number WO 2007/094817, both of which are hereby incorporated by reference in their entirety.

For sensor applications especially, the disclosed light enhancement devices may be treated to facilitate the adsorption and immobilization of molecules of interest to specific regions on the light enhancement devices, e.g., the substrate surface at the bottom of the cavity. Molecules of interest include, but are not limited to biomolecules, such as those described above. Similarly, the disclosed light enhancement devices may be treated to prevent the adsorption of such molecules to specific regions on the light enhancement devices, e.g., the surface of the metallic film. As used herein, the phrase "passivating" and "passivation" are used to refer to the prevention of the adsorption of molecules of interest to specific regions on the light enhancement devices.

Functionalized silane molecules are often used to facilitate the adsorption and immobilization of biomolecules to glass surfaces. Silane molecules form stable bonds with glass surfaces via Si—O—Si bond formation. Silanes may be functionalized with a variety of molecular groups for coupling to biomolecules, thereby immobilizing the biomolecules on silane-treated glass. Such functionalized silanes (e.g., biotin-PEG-silane) are known, as are methods of treating glass surfaces with such molecules. Other molecules for facilitating the adsorption of biomolecules to glass surfaces are known, including, but not limited to those disclosed in U.S. Ser. No. 11/497,581, International Publication Number WO 2007/094817, and U.S. Pat. Pub. No. 2008/0032301, which are hereby incorporated by reference in their entirety.

To ensure that molecules of interest adsorb to specific regions on the light enhancement devices, the other regions of the light enhancement devices may be passivated. The types of molecules used for passivation depend upon the region to be passivated (i.e., the metallic film or the substrate material). For passivation of metallic films, the types of molecules used for passivation also depend upon the identity of the metal.

By way of example only, gold surfaces may be passivated with a variety of alkylthiols, including, but not limited to PEG-thiol. Alkylthiols are known, as are methods of treating gold surfaces with such molecules. See, e.g., International Publication Number WO 2007/094817 and K. L. Prime and G. M. Whitesides, "Adsorption of proteins onto surfaces containing end-attached oligo(ethylene oxide): a model system using self-assembled monolayers," *Journal of the American Chemical Society*, 115, 10714-10721 (1993).

For other metals, including aluminum, another approach is possible. Aluminum may be classified as a very active metal due to its ability to oxidize very quickly. The aluminum oxide layer is chemically bound to the surface and it seals the core aluminum from any further reaction. Since silane molecules attach to both aluminum (Al—O—Si) and glass (Si—O—Si), passivation of aluminum is important for restricting the adsorption of silane molecules (and subsequently coupled biomolecules) to the substrate surface at the bottom of the cavity. Alkyl phosphonic acids may be used to passivate a variety of metal oxides, such as titanium oxide and aluminum oxide, while not binding to silica surfaces in an aqueous medium. See Korlach, J. et al., Selective aluminum passivation for targeted immobilization of single DNA polymerase molecules in zero-mode waveguide nanostructures. *Proceedings of the National Academy of Sciences* 2008, 105, (4), 1176-1181; Mutin, P. H., et al., Selective Surface Modification of SiO2−TiO2 Supports with Phosphonic Acids. *Chemistry of Materials* 2004, 16, (26), 5670-5675; Michel, R. et al., Selective Molecular Assembly Patterning:  A New Approach to Micro- and Nanochemical Patterning of Surfaces for Biological Applications. *Langmuir* 2002, 18, (8), 3281-3287. In addition, alkyl phosphonic acids form self-assembled monolayers (SAMs) on a number of oxide surfaces, such as tantalum oxides (See Brovelli, D., et al., *Langmuir* 1999, 15, 4324), aluminum oxides, (See Hauffman, T., et al., Study of the Self-Assembling of n-Octylphosphonic Acid Layers on Aluminum Oxide. *Langmuir* 2008, 24, (23), 13450-13456; Hoque, E., et al., *J. Chem. Phys.* 2006, 124, 174710) and titanium oxide (See Adden, N., et al., Phosphonic Acid Monolayers for Binding of Bioactive Molecules to Titanium Surfaces. *Langmuir* 2006, 22, (19), 8197-8204; Mutin, P. H., et al., Selective Surface Modification of SiO2−TiO2 Supports with Phosphonic Acids. *Chemistry of Materials* 2004, 16, (26), 5670-5675). One of the main reasons for using phosphonic acids rather than carboxylic acids is their stronger binding with the oxide. As noted above, aluminum forms a native oxide when exposed to an oxygen-containing environment. Phosphonic acids are generally deposited from an organic or water-diluted ($10^{-3}$ mol/L) solution. Phosphonic acids interact with the aluminum hydroxyl groups, where an increase in the amount of surface hydroxyls enhances the phosphonic acid deposition. See Hoque, E., et al., *J. Chem. Phys.* 2006, 124, 174710. Phosphonic acid specifically reacts to hydrated aluminum oxide, through Al—O—P bond. The Si—O—P bond formed on glass substrates are easily hydrolysable. The phosphonic acid prevents subsequent chemical treatments, such as exposure to silane containing molecules, from reacting with the aluminum. Then, molecules of interest can be attached to non-aluminum surfaces via reaction with a specific functional group of the silane molecule, as described above.

Any of the disclosed light enhancement devices may further include a passivation layer disposed over the film of metal, wherein the passivation layer is capable of preventing the adsorption of a molecule of interest to the film of metal. The passivation layer may be disposed over the film of metal, including the metallic sidewalls of the cavity, but not over the exposed substrate surface at the bottom of the cavity. In some embodiments, the passivation layer comprises an alkylthiol or an alkyl phosphonic acid. In some embodiments, the passivation layer comprises a self-assembled monolayer of an alkylthiol or an alkyl phosphonic acid. Any of the alkylthiol molecules disclosed above, as well as any of the methods for passivating surfaces with such molecules, may be used. Similarly, a variety of alkyl phosphonic acids or combinations of alkyl phosphonic acids may be used, including, but not limited to those in which the alkyl chain is a substituted or unsubstituted, straight chain or branched alkyl having 1 to 25 carbons, e.g., from 4 to 20 carbons, or 8 to 15 carbons, etc. Any of the alkyl phosphonic acids disclosed in U.S. Pat. Pub. No. 2008/0032301, which is hereby incorporated by reference in its entirety, may also be used. Similarly, any of the methods for passivating surfaces with such molecules disclosed in this reference may be used. In some embodiments, the alkyl phosphonic acid is butyl phosphonic acid or decyl phosphonic acid, or combinations thereof. The examples below further describe methods of passivating aluminum surfaces with butyl phosphonic acid and decyl phosphonic acid.

Finally, other techniques for passivating the disclosed light enhancement devices are possible, including, but not limited to those disclosed in U.S. Ser. No. 11/497,581, International Publication Number WO 2007/094817, and U.S. Pat. Pub. No. 2008/0032301, which are hereby incorporated by reference in their entirety.

How to Make

Also provided are methods for making the disclosed light enhancement devices. The methods involve forming a film of metal over a substrate and forming at least one cavity in the film of metal. The formed cavities are characterized as described above. Techniques for forming films of metal over substrates are known. By way of example only, physical vapor deposition (PVD) techniques or chemical vapor deposition (CVD) techniques may be used to deposit thin metal films on substrates.

The composition and characteristics of the metallic film and the substrate may vary. In some embodiments, the film of metal may comprise gold, aluminum, silver, copper, platinum, or combinations thereof. However, other metals, metal alloys, or metallic compounds are possible. The film of metal may be a single layer of metal, but in other embodiments, the film of metal may comprise two, three, four, or more layers of metal. Other layers may be incorporated into the metallic film, including, but not limited to layers of dielectric materials such as metal oxides or perovskites. Non-limiting examples of dielectric materials include $Al_2O_3$, $TiO_2$, $Ta_2O_5$, $TiWO_3$, and the like. The surface characteristics of the metallic film may vary. In some embodiments, the top surface of the metallic film is substantially flat, but in other embodiments the top surface may include a variety of surface features as described herein. Specific examples of substrates are also provided herein.

The methods for forming any of the disclosed cavities are based on known semiconductor processing methods. Such methods include, but are not limited to, focused ion beam lithography; electron beam lithography and reactive ion etching; and optical interference lithography. See U.S. Ser. No. 11/497,581; International Publication Number WO 2007/094817; "S. C. Lee and S. R. Brueck, "Nanoscale two-dimensional patterning on Si(001) by large-area interferometric lithography and anisotropic wet etching," Journal of Vacuum Science & Technology B 22, 1949-1952 (2004), and S. Y. Chou, P. R. Krauss, and P. J. Renstrom "Nanoimprint lithography," Journal of Vacuum Science & Technology B 14, 4129-4133 (2004). These references describe each of these techniques in detail and are hereby incorporated by reference in their entirety.

Regarding focused ion beam lithography, this technique can be used to directly mill cavities in metallic films. The diameter of the cavity may be adjusted by adjusting the diameter of the ion beam. Cavities having tapered sidewalls may be formed by adjusting the diameter of the ion beam during the milling process, e.g., decreasing the diameter of the ion beam as the beam mills through the metallic film.

Regarding electron beam lithography and reactive ion etching, this technique involves exposing a substrate covered with a resist to an electron beam to pattern the resist; selectively removing either the exposed or non-exposed regions of the resist; and transferring the pattern to the substrate by etching. Cavities having tapered sidewalls may be formed by adjusting certain parameters during the electron beam lithography step, the reactive ion etching step, or both. During the electron beam lithography step, the intensity of the electron beam affects the degree to which chemical bonds in the resist material are broken (i.e., the degree to which the resist becomes "exposed"), and thus, the diameter of the pattern formed in the resist. Adjusting the intensity of the electron beam during exposure of the resist can provide a diameter that either increases or decreases along the depth of the resist, thereby forming a tapered sidewall. During the reactive ion etching step, the gas composition, the gas flow, the gas pressure, and the RF power may be adjusted in order to achieve a desired sidewall angle.

Following are more detailed descriptions of how to make the various embodiments shown. To make the conical cavity of FIG. 1, apply a thin metal layer through sputtering, CVD, or other desired method on a substrate. Apply a resist to the metal layer. Pattern the resist per standard lithography techniques. Perform a heavy mechanical isotropic etch resulting in resist erosion and causing formation of the conical shaped cavity.

Figure 21:
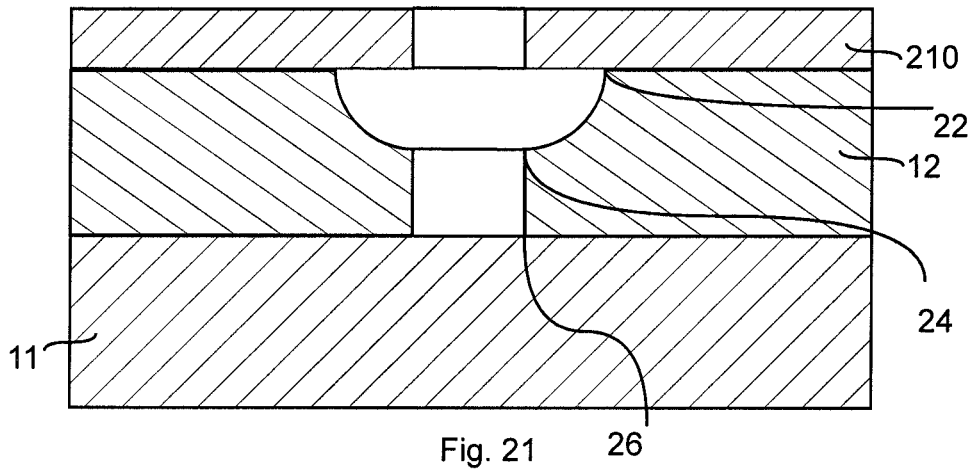
FIG. 21 is a cross-sectional view showing a method of making a light-enhancement device.

To make the champagne glass shaped structure of FIG. 2, a thin film 12 is adhered to substrate 11 through sputtering, CVD, or other desired method. As shown in FIG. 21, the mask or pattern 210 will match the pattern of node 24. Initially, an isotropic wet etch is used to create the cup portion of the champagne glass shape. The type and time of isotropic wet etch will determine the width and depth of the upper portion. Following the isotropic etch, an anisotropic etch is used to create the lower portion of the cavity. The mask 210 is then removed.

Figure 22:
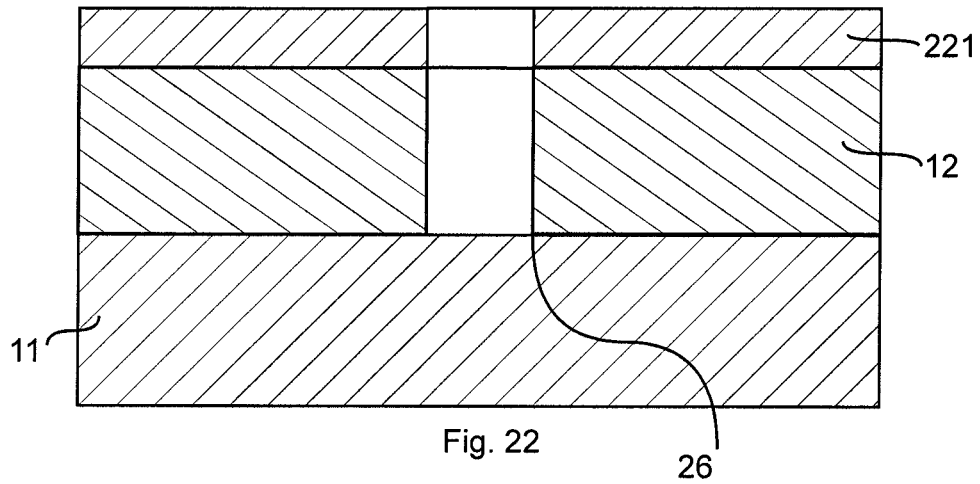
FIG. 22 is a cross-sectional view showing a method of making a light-enhancement device.
Figure 23:
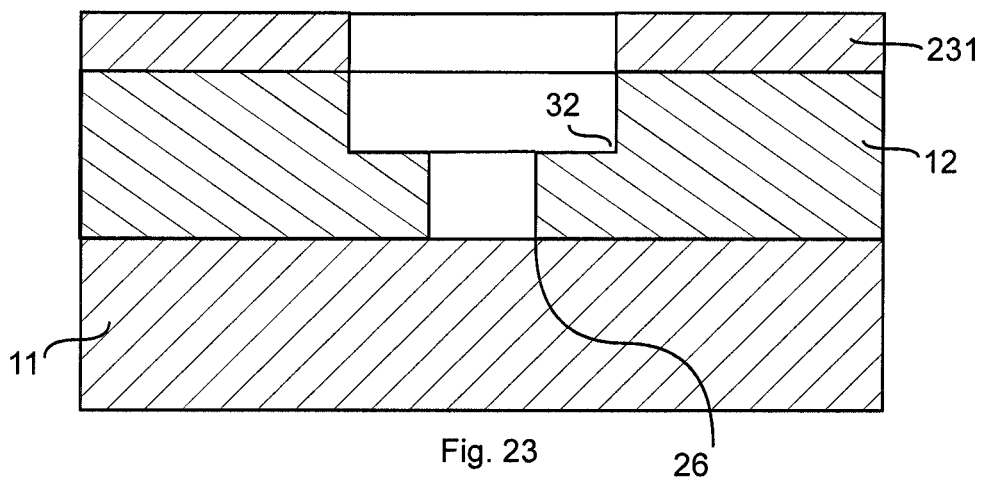
FIG. 23 is a cross-sectional view showing a method of making a light-enhancement device.

A double mask can be used to make the structures shown in FIG. 3 and FIG. 4. The first mask 221 is made to align with node 26 as shown in FIG. 22. An anisotropic etch is used to etch all the way through to the substrate. The first mask 221 is removed and a second mask 231 is made to align with node 32 as shown in FIG. 23. An anisotropic etch is then used to etch part way through metallic layer 12 of FIG. 3 or all the way through metallic layer 41 of FIG. 4. The second mask 231 is then removed.

Figure 24:
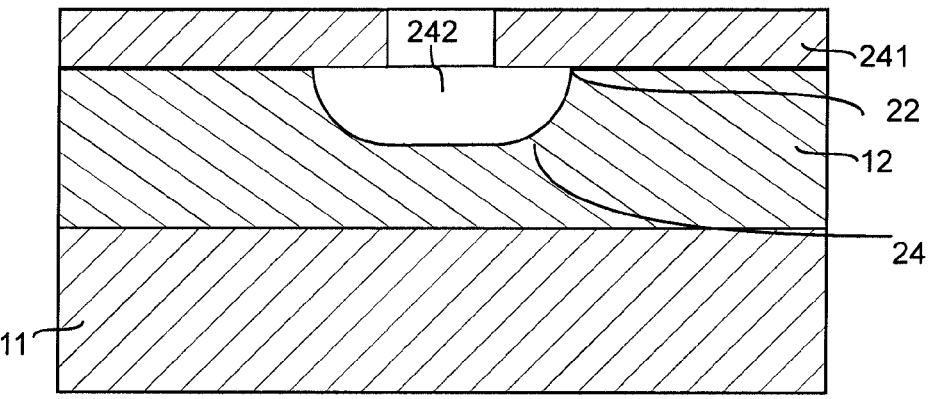
FIG. 24 is a cross-sectional view showing a method of making a light-enhancement device.
Figure 25:
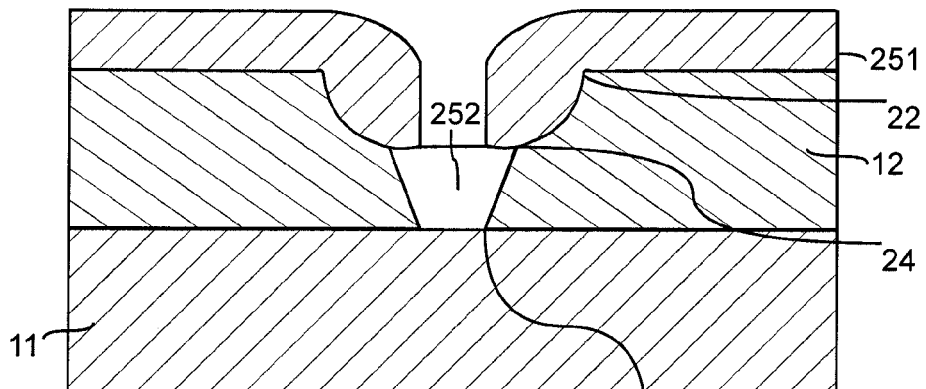
FIG. 25 is a cross-sectional view showing a method of making a light-enhancement device.

To make cavity 13d, shown in FIG. 5, begin with an isotropic wet etch 242 of mask 241 as shown in FIG. 24. Remove the first mask 241 and apply a second mask 251 as shown in FIG. 25. Do an isotropic dry etch 252. Cavity 13e, shown in FIG. 6, can be made the same as cavity 13d with the exception that the first etch is a resist erosion isotropic dry etch instead of an isotropic wet etch. Cavity 13f, shown in FIG. 7, can be etched the same as cavity 13e. The difference in making cavity 13f is that at least two layers 41 and 42 are applied prior to patterning and etching.

Figure 26:
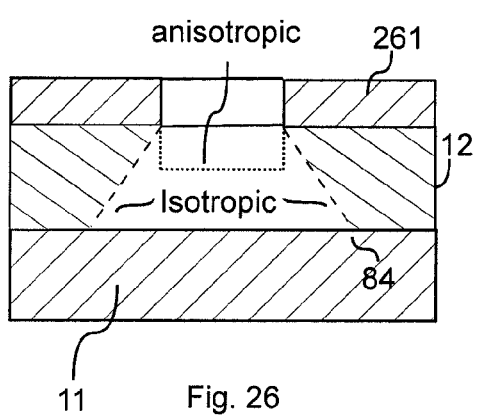
FIG. 26 is a cross-sectional view showing a method of making a light-enhancement device.

To make the cavity 13g of FIG. 8, an initial anisotropic etch (indicated by the shorter dashed lines) is followed by an isotropic dry etch (indicated by the longer dashed lines), as shown in FIG. 26. Note that the mask 261 is aligned with node 82. The isotropic dry etch widens the cavity to the width of node 84.

Figure 10:
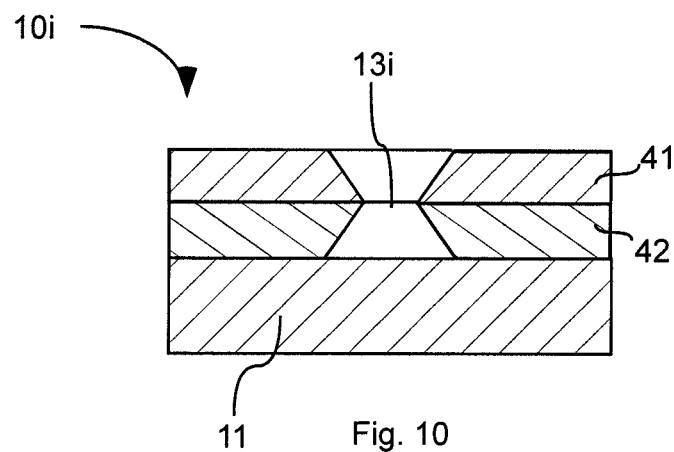
FIG. 10 is a cross-sectional view of a light-enhancement device.
Figure 27:
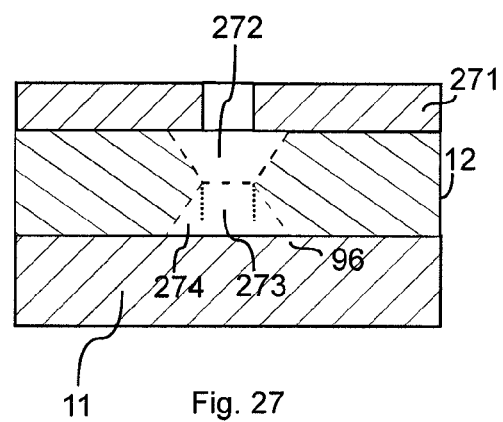
FIG. 27 is a cross-sectional view showing a method of making a light-enhancement device.

To make the cavity 13h of FIG. 9, an initial isotropic dry etch 272 is followed by an anisotropic etch 273 then a second isotropic dry etch 274 as shown in FIG. 27. Note that the anisotropic etch is indicated by the shorter dashed lines and the isotropic etches are indicated by the longer dashed lines. Mask 271 is aligned with node 94. The isotropic dry etch widens the cavity to the width of node 92 at the top of the cavity and to the width of node 96 at the bottom of the cavity. Cavity 13i of FIG. 10 is made in a similar manner. The difference is that multiple metallic layers 41 and 42 are applied to the substrate.

To make cavity 13j of FIG. 11, an anisotropic etch is used down to the desired depth of nodes 111 and 112. This is followed by an isotropic wet etch to the desired depth of nodes 113 and 114. The final etch is anisotropic down to the substrate 11.

Figure 28:
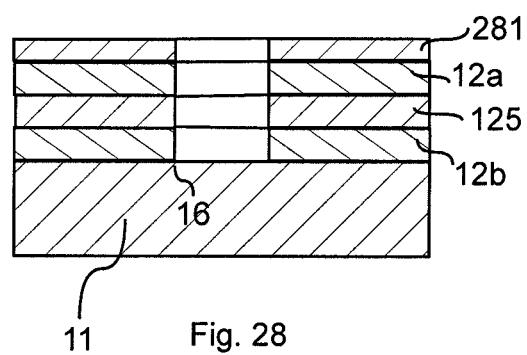
FIG. 28 is a cross-sectional view showing a method of making a light-enhancement device.
Figure 29:
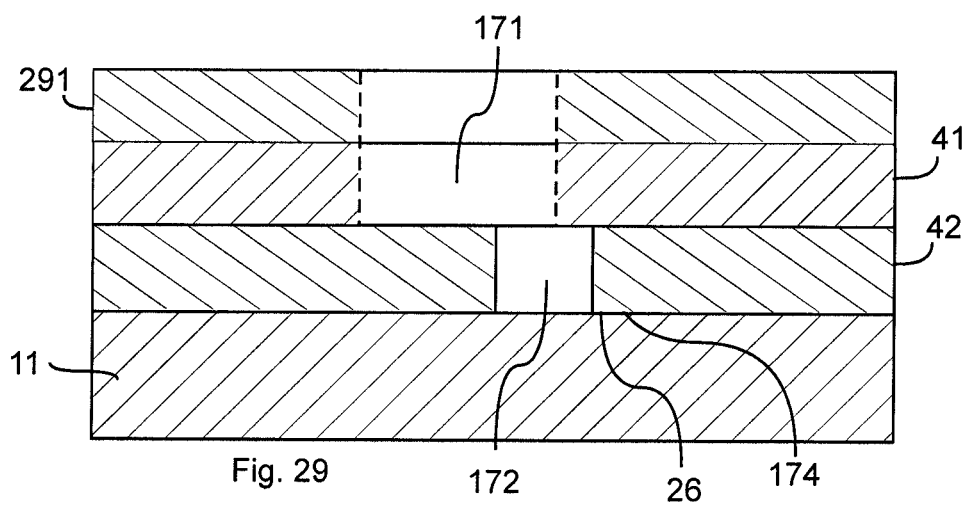
FIG. 29 is a cross-sectional view showing a method of making a light-enhancement device.

To make cavity 13k of FIG. 12, a metallic layer 12b is sputtered on top of a substrate 11, followed by a dielectric layer 125 and another metallic layer 12a. See FIG. 28. An anisotropic etch etches through both metallic layers 12a and 12b and through the dielectric layer 125. Note that the mask 281 is aligned with node 16. A selective isotropic etch then etches laterally into dielectric layer 125 and also into the substrate, the etch rate being selective between the dielectric and the metallic layers. Cavity 13L of FIG. 13 is made by the same method. A difference between making cavity 13L and cavity 13k is that in cavity 13L more alternating layers of metal and dielectric are applied prior to etch.

To make the elliptical or circular cross-sectional shape of cavity 13m in FIG. 14, the initial etch is anisotropic. The etch is changed to more and more isotropic while progressing towards the center of the cavity. This isotropic etch cuts the layers back away from line 131 towards the center of the cavity. After passing the center, the etch is made more and more anisotropic until it is primarily anisotropic when the substrate is reached. Following this etch, a selective isotropic etch is used to etch back the dielectric layers as was done with cavity 13L.

Figure 15:
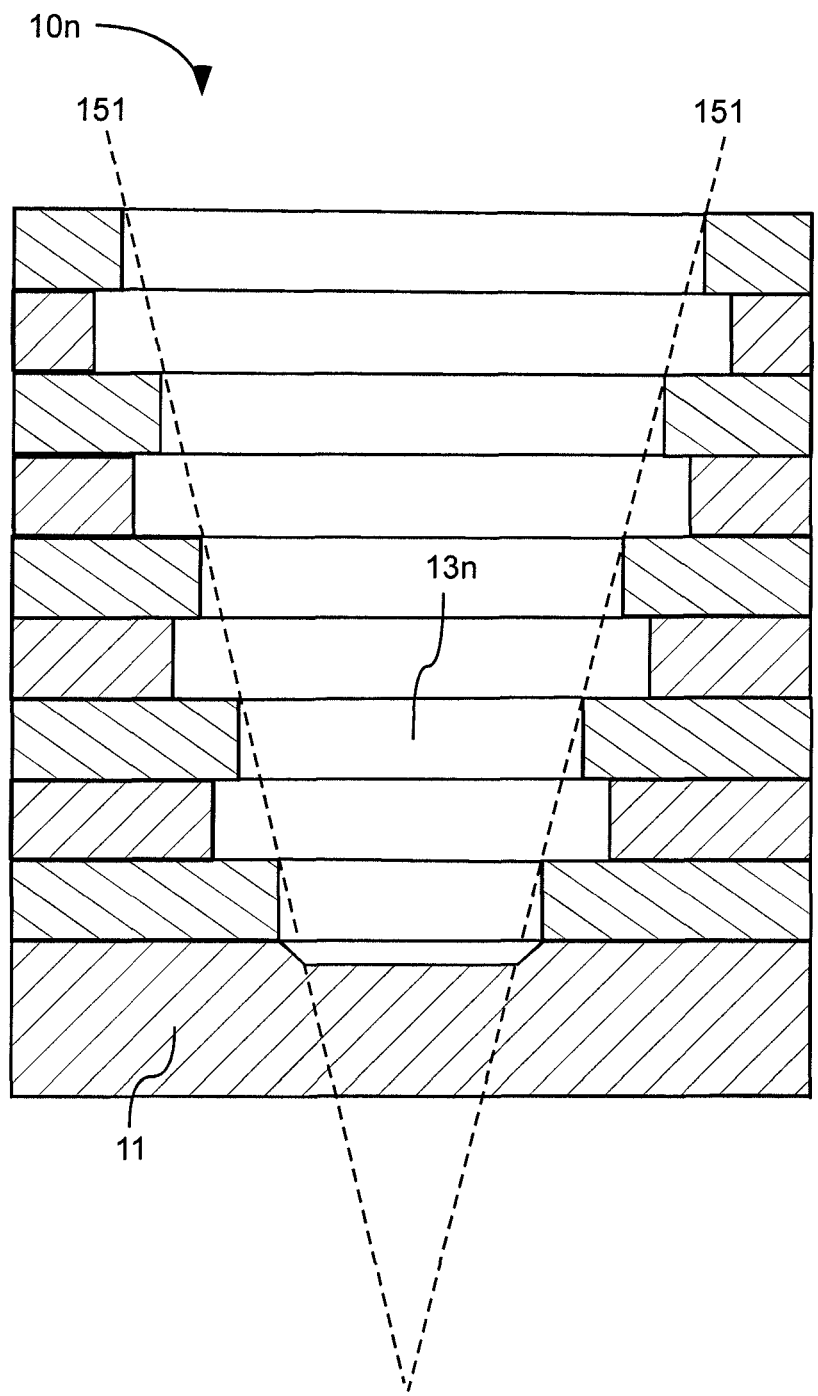
FIG. 15 is a cross-sectional view of a light-enhancement device.

To make the "V" shaped cavity of 13n in FIG. 15, the initial etch is isotropic. The etch is changed to more and more anisotropic while progressing towards the bottom of the cavity. The mask would be aligned with the cavity width at the bottom of the cavity. Following this etch, a selective isotropic etch is used to etch back the dielectric layers as was done with cavity 13L.

The method for making the structure in FIG. 16 is similar to the method as for making the structure of FIG. 3. To make cavity 13o, following the first etch, align the second mask off-center from the first cavity. To make cavity 13p of FIG. 17, layer 42 is patterned and etched to form cavity 172. Another layer 41 is applied on top of layer 42. A resist 291 is applied on top of layer 41. The resist and layer 41 are etched, as indicated by the dashed lines, to form cavity 171. The resist 291 is then removed.

WORKING EXAMPLES

Figure 30:
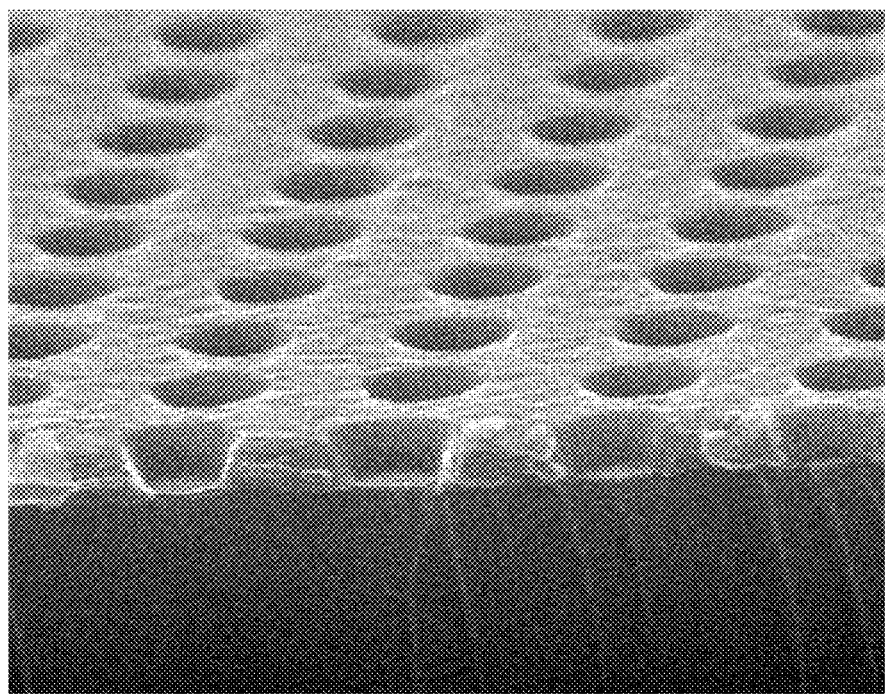
FIG. 30 shows an image of an array of conical cavities in a metallic film (aluminum).

Single cavity and sub-wavelength cavity arrays in optically opaque Al films (with thickness 100 nm) on glass were studied. An example is shown in FIG. 30. Array parameters (periodicity: $a_0$ and cavity diameter: d) were optimized for higher enhancements for the excitation wavelengths 532 nm and 635 nm. Higher enhancements for the periodicities of 500 nm, 550 nm with corresponding cavity diameters of 200 nm, 250 nm each were observed. Below, the study on a cavity and cavity array in Al film with $a_0$=500 nm and d=200 nm and also with $a_0$=550 nm and d=250 nm with a range of taper angles from 0° to 60° is discussed. A similar cavity array in a 100 nm thick Au film was also considered for enhancement effects with $a_0$=450 nm and d=200 nm along with $a_0$=550 nm and d=200 nm for a range of taper angles. Other array geometries showed very similar behavior.

Electromagnetic calculations were performed using COMSOL multiphysics v3.5a. A glass substrate was assumed on top of which an aluminum film was placed; the upper region was air. The dielectric properties of metal were incorporated via the complex dielectric constant as measured by spectroscopic ellipsometry from 300-1600 nm. The size of the computational space used was set by the cavity array periodicity in the x-y direction with periodic boundary conditions applied on the faces. The cavity arrays were excited by light polarized along the y-direction and the enhancements were calculated for both directions of incidence (air side (above), substrate side (below)). The enhancement was calculated by integrating total field intensity within a volume of a 10 nm slice at the bottom of a cavity and dividing by the total integrated intensity within the same volume but in the absence of the metallic film. In the calculations for a single cavity as a comparison with the cavity array all of the above conditions were similar except radiation boundary conditions were applied on the faces. See F. Mandavi, Y. Liu, and S. Blair, "Modeling Fluorescence Enhancement from Metallic Nanocavities," Plasmonics 2, 129 (2007).

Example 1

Single Conical Aperture

Figure 31:
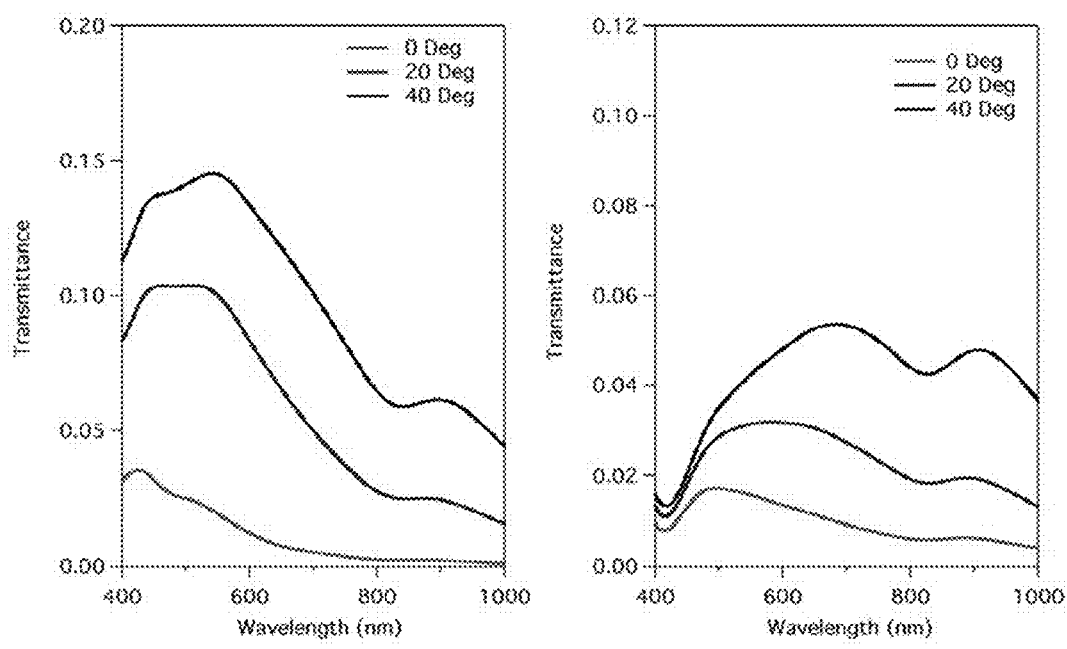
FIG. 31 shows the calculated transmittance through a cavity (with d=200 nm) in aluminum film with a thickness of 100 nm on a glass substrate with different taper angles. The cavity under consideration was illuminated from the air side (A) and the glass side (B).

The calculated normalized transmission spectra for a single cavity is shown in FIG. 31. A rapid increase of transmittance with increasing taper angle and a systematic spectral peak shift toward longer wavelengths was observed when the illumination was from the air side (FIG. 31A). The transmittance peaks also became wider with increasing taper angle. The transmittance did not have such a drastic effect when illuminated from glass side (FIG. 31B).

Figure 32:
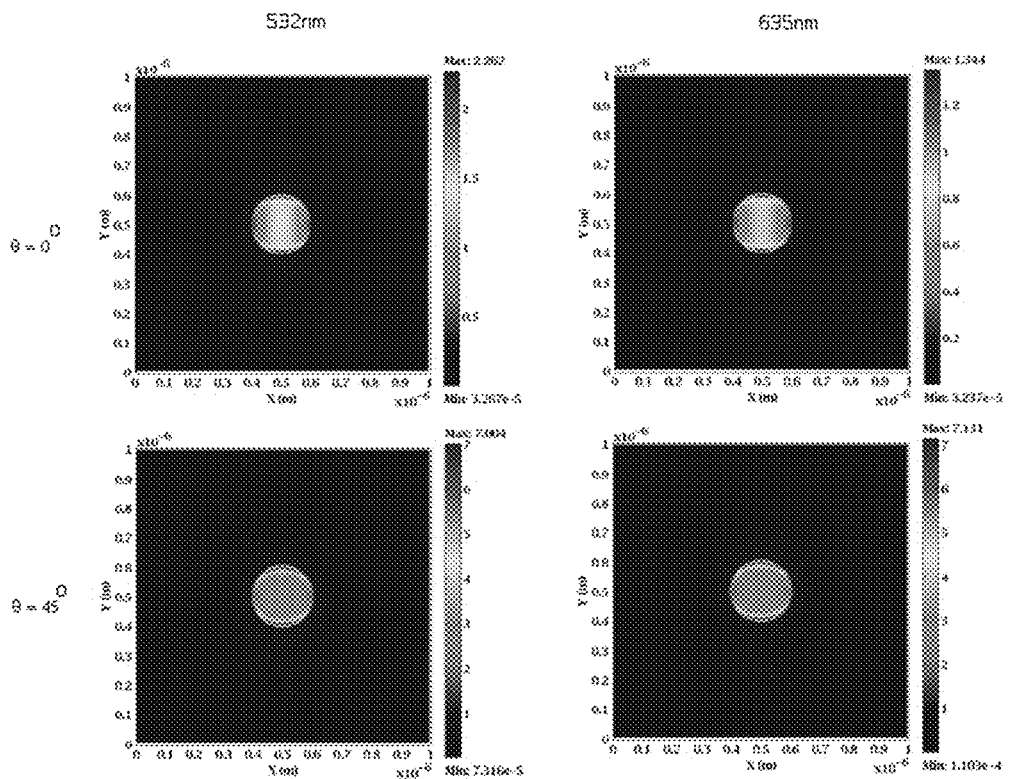
FIG. 32 shows the normalized optical power flow through a single cavity as evaluated at the bottom of the conical cavity as seen in an XY cross-section. The cavity dimensions were d=200 nm and t=100 nm and the cavity was excited from the air side.
Figure 33:
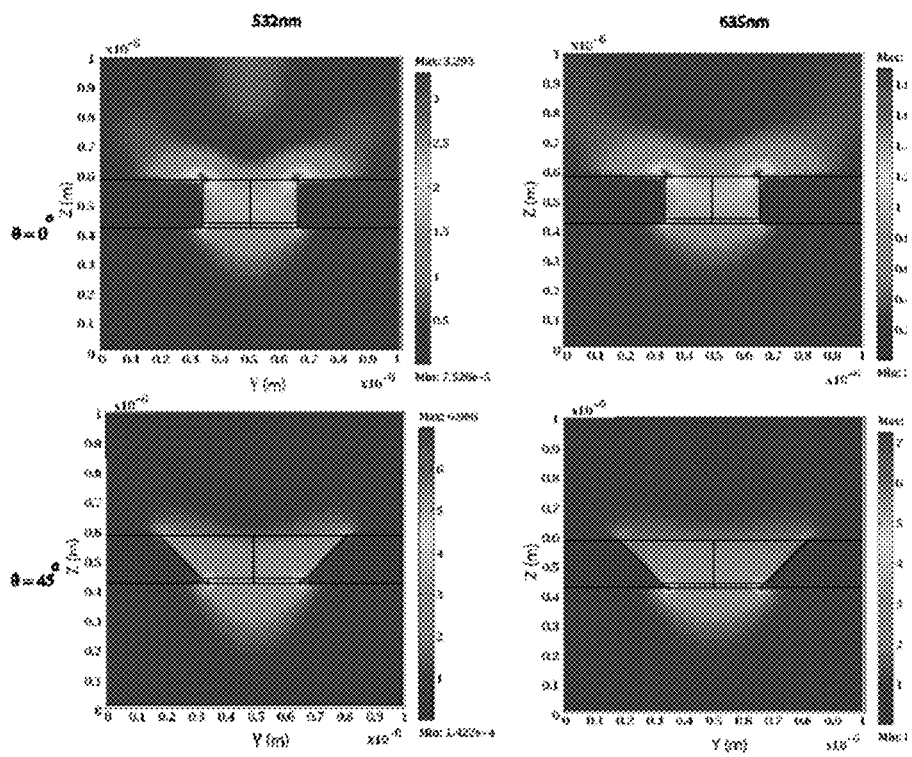
FIG. 33 shows the normalized optical power flow through a single cavity as evaluated at the bottom of the conical cavity as seen in a YZ cross-section. The cavity dimensions were d=200 nm and t=100 nm and the cavity was excited from the air side.
Figure 34:
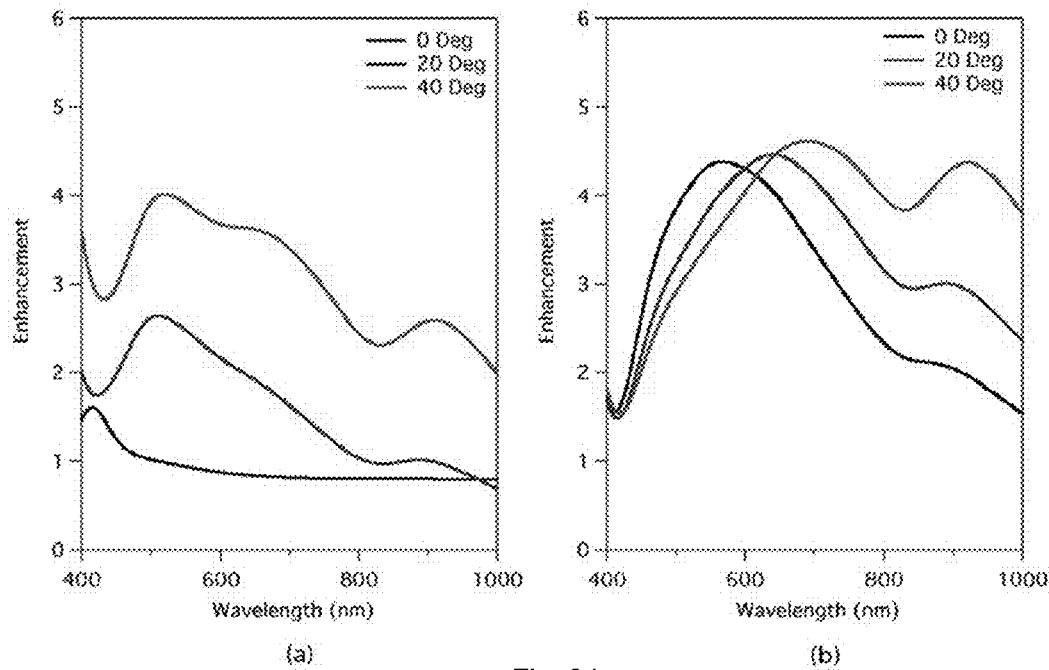
FIG. 34 shows the calculated intensity enhancement at the bottom of a single conical cavity in a 100 nm thick aluminum film. The cavity had a diameter of d=200 nm and was illuminated from the air side (A) and the glass side (B).
Figure 35:
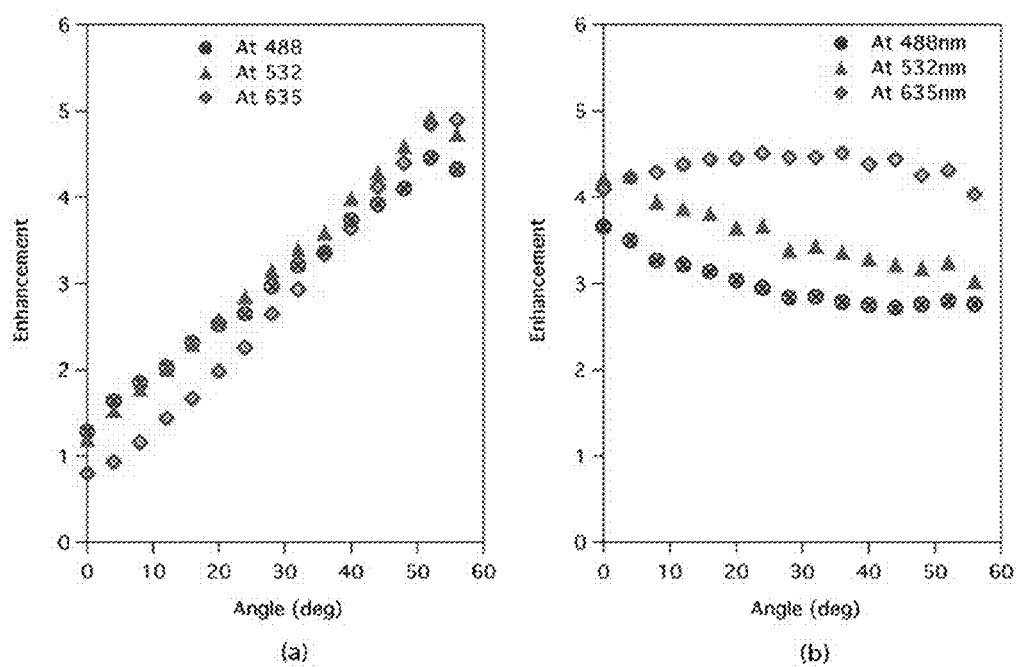
FIG. 35 shows the calculated intensity enhancement at the bottom of a single conical cavity in a 100 nm thick aluminum film. The cavity had a diameter of d=200 nm and was illuminated from the air side (A) and the glass side (B).

The normalized power flow through such a cavity as evaluated at the bottom of the cavity for a sidewall taper angle of 45° was about 3 times higher at 532 nm and about 5 times higher at 635 nm when compared to the one with straight sidewalls. The cavity showed considerable intensity enhancement with increasing taper angle (taper angle ✓ as measured from a plane perpendicular to the surface of the substrate) for the cavity side-walls for both directions of incidence (air side, substrate side) as seen in FIGS. 31 through 33. The calculated enhancement at the bottom of such a cavity varied over a wide range of wavelengths for both directions of illumination as seen in FIG. 34. The enhancement at particular wavelengths of interest (488 nm, 532 nm, 635 nm) could further be tuned by varying the cavity sidewall taper angle for both directions of illumination (FIG. 35). However the air side illumination had a larger improvement in enhancement as a function of taper angle as compared to substrate side illumination. With increasing taper angles (✓>50°) the cavity becomes "shallower" and the light confinement effect became weaker which was clearly evident from a drop in enhancement (FIG. 35).

Example 2

Regular Arrays of Conical Apertures

In a metal film with a periodic array of cavities, the periodicity allows for grating coupling of the SPPs to light that results in resonantly enhanced transmission bands, known as "extraordinary of enhanced optical transmission" (EOT). The main effect of arranging the cavities in this particular manner is to enhance the collection efficiency of the incident light. The transmittance of a single cavity gets modulated because of this coupling between holes through propagating SPPs (surface waves). The transmission spectrum of a cavity array depends both on the periodicity as well as the cavity size in a similar manner.

Figure 36:
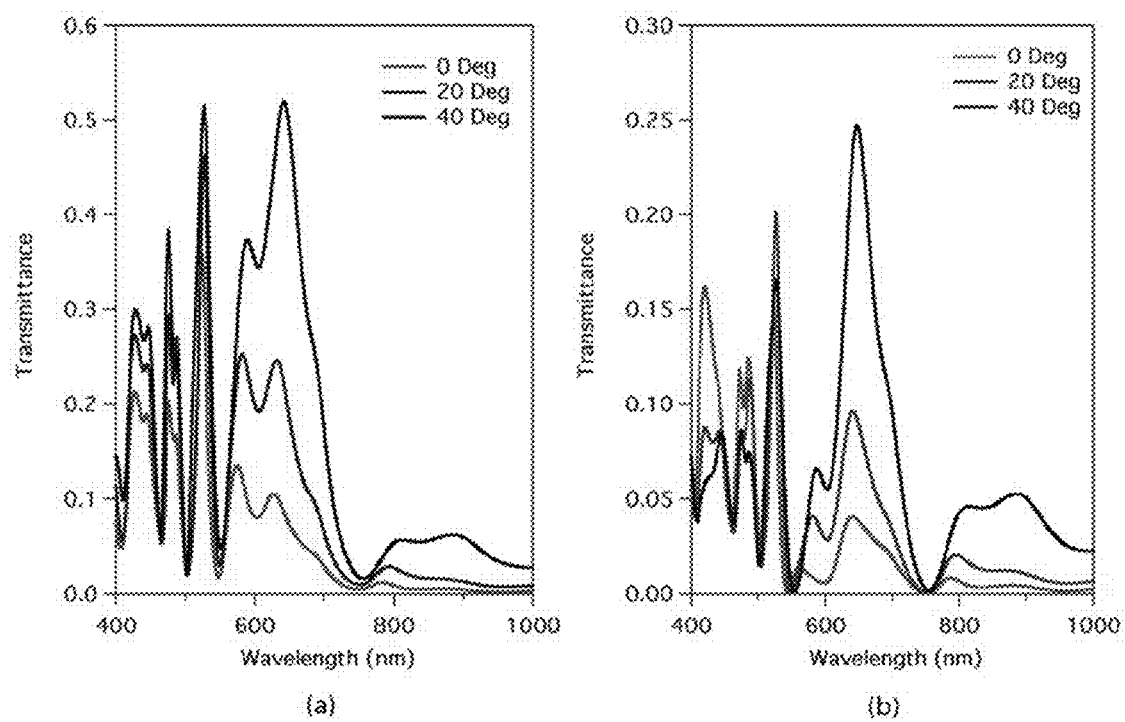
FIG. 36 shows the calculated transmittance through a cavity array in a 100 nm aluminum film on glass with different taper angles. The array parameters were $a_0$=500 nm and d=200 nm. The illumination was from the air side (A) and the glass side (B).

The transmission spectra of cavity arrays with different cavity sidewall taper angles is shown in FIG. 36. The transmission spectra red-shifted, broadened and the transmission increased with increasing taper angles when the array was illuminated from air side. The observed increase in the width of the transmitted peaks with increasing cavity size indicates that the radiative damping of the SPPs increases with cavity size. The transmittance minima however does not have a significant shift with increasing taper angle.

Figure 37:
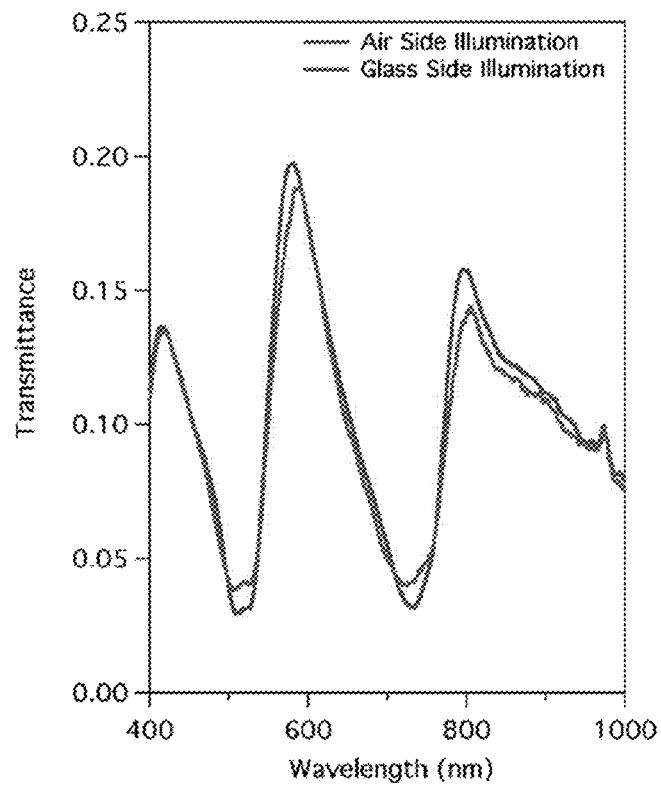
FIG. 37 shows the measured transmittance through an array of cavities in a 100 nm aluminum film on glass, for both sides of illumination. The array parameters in were $a_0$=500 nm and d=200 nm.

As seen in FIG. 37, the transmittance spectra through such an array of cavities was measured over a broad range of wavelengths (of about 50-100 nm) using a fiber coupled halogen white light source and the Avantes multichannel spectrometer for both directions of illumination at normal incidence. It was seen that the transmission through these conical shaped apertures does not depend very strongly on whether light enters from the air side or the substrate side. (The intensity enhancement, however, does depend on which way light enters, as properly represented in other figures.)

Figure 38:
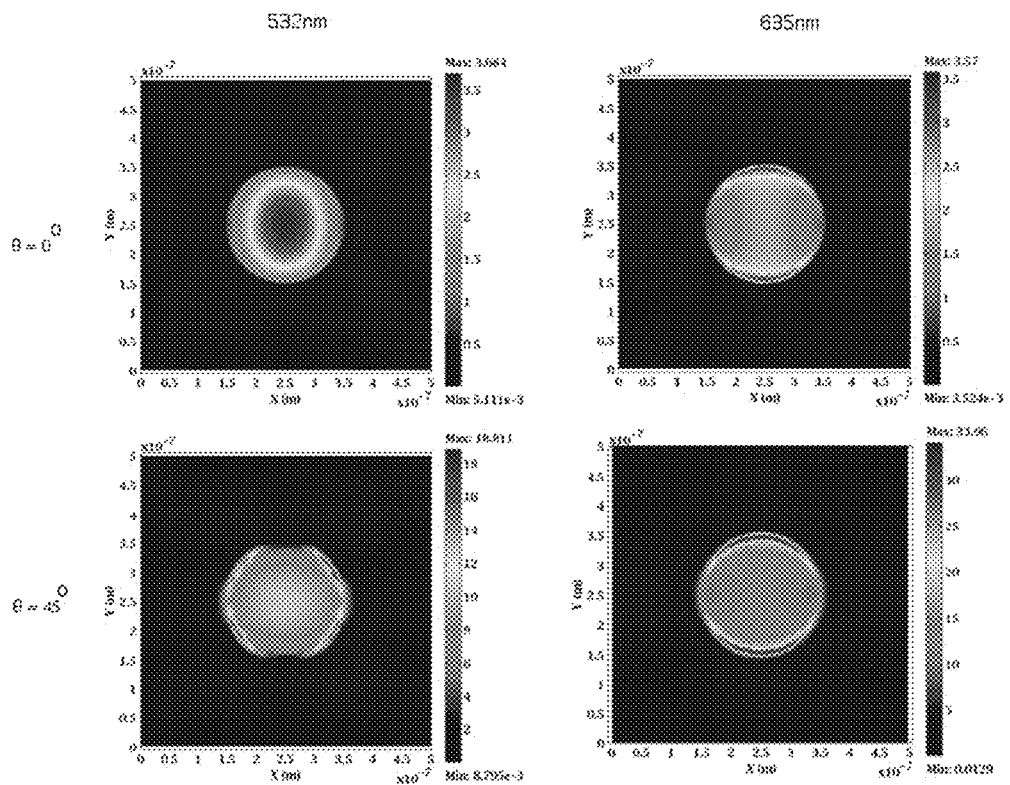
FIG. 38 shows the normalized optical power flow through the cavity array as evaluated at the bottom of a conical cavity. The cavity array parameters were $a_0$=500 nm, d=200 nm, and t=100 nm. The array was excited from the air side.
Figure 39:
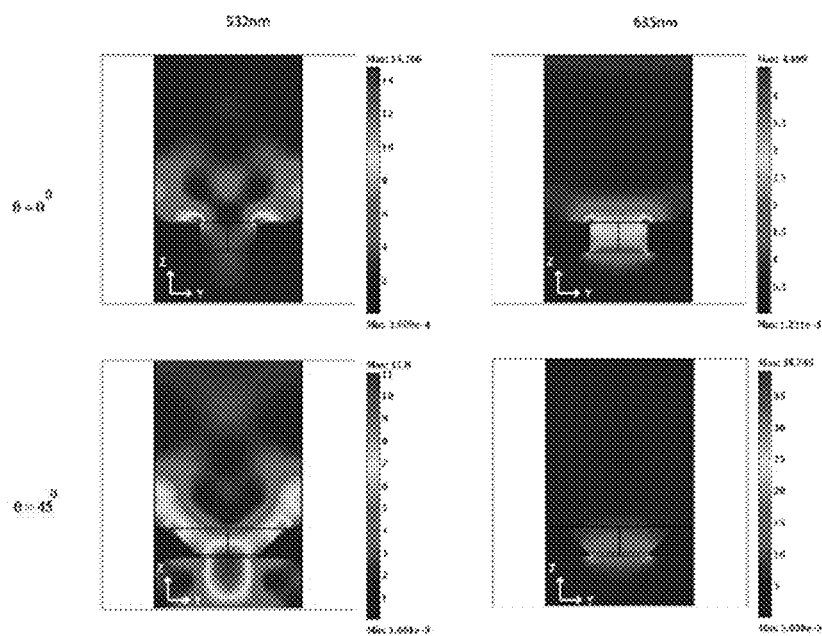
FIG. 39 shows the normalized optical power flow through the cavity array as evaluated at the bottom of a conical cavity as seen in a YZ cross-section. The cavity array parameters were $a_0$=500 nm, d=200 nm, and t=100 nm. The array was excited from the air side.

The net incident optical power flow through the metallic cavity array when illuminated from the air side was also studied. The electric field remained finite at the metallic boundaries, and a considerable flux moved downward along the tapered cavity side walls. The sidewalls thus represent sinks of radiation. The "funnel" effect in these tapered cavities is particularly evident in FIGS. 38 and 39. The normalized power flow at the bottom of a cavity in case of a side wall taper angle of 45° was about 5 times higher at 532 nm and about 10 times higher at 635 nm as compared to a cavity with straight side-walls.

Figure 40:
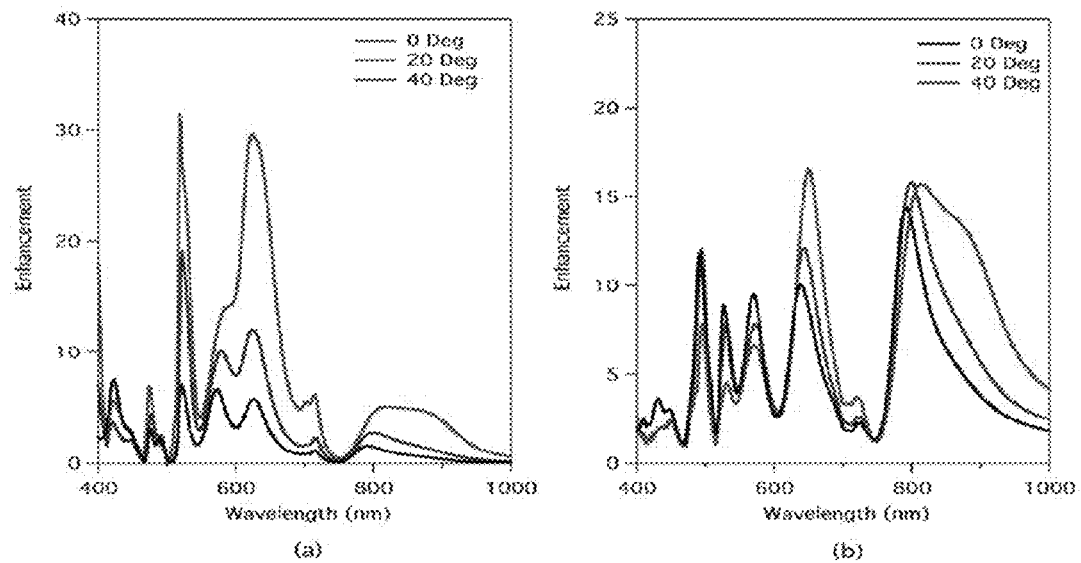
FIG. 40 shows the calculated intensity enhancement through a cavity array in a 100 nm aluminum film on glass with different taper angles. The array parameters were $a_0$=500 nm and d=200 nm. The illumination was from the air side (A) and the glass side (B).
Figure 41:
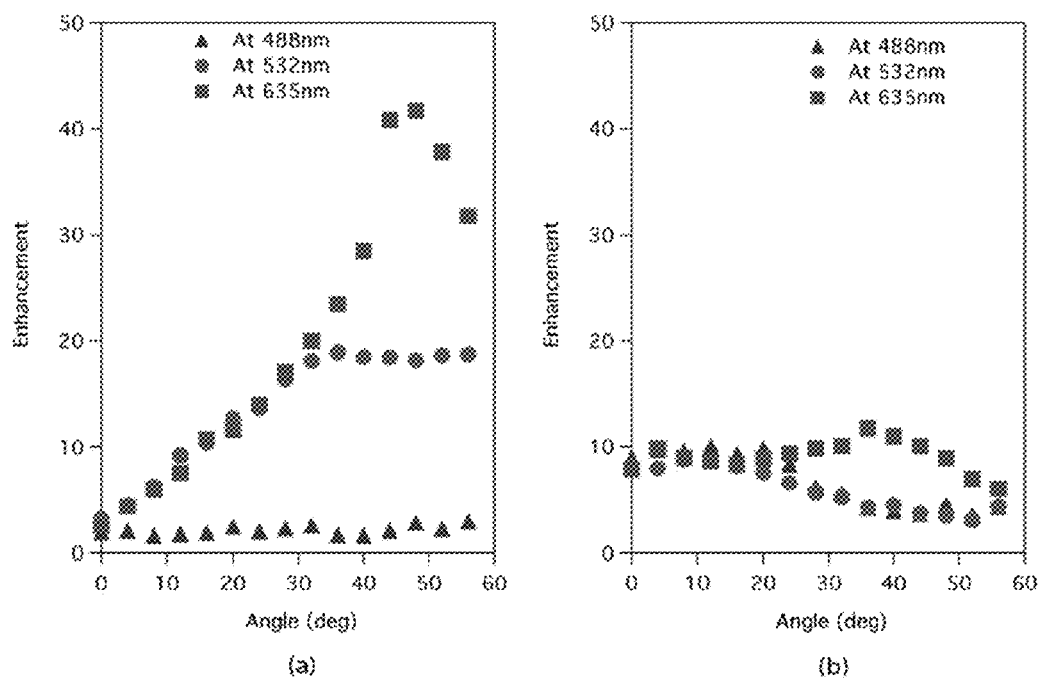
FIG. 41 shows the calculated intensity enhancement through a cavity array in a 100 nm aluminum film on glass with different taper angles. The array parameters were $a_0$=500 nm and d=200 nm. The illumination was from the air side (A) and the glass side (B).

The enhancement at the bottom of a conical cavity in this metallic array varied over a wide range of wavelengths as shown in FIG. 40. The average enhancement factor was as high as 15 over a broad wavelength range of about 250 nm for air side illumination; and also about 8 over a wavelength range of 250 nm for glass side illumination for ✓=40°. As shown in FIG. 41, for an array of such cavities with conical side walls the enhancement can increase twenty-fold as compared to such an array with same size cavity but with straight side-walls. As seen in the case of a single cavity, the enhancement has a much weaker dependence on the cavity taper angle when the array is excited from glass side at a particular excitation wavelength (532 nm or 635 nm) as the cavity diameter is always fixed at 200 nm in this case. The effect of having a wider cavity on the exit side (air) is not so much of importance to field localization at the cavity bottom, hence to the enhancement, as the SPP coupling is initiated from the first film interface (metal-glass) which propagates along it and down to the second interface (metal-air). This offers a possible way of getting selective-enhancement at both the wavelengths of interest (532 nm and 635 nm) by carefully designing the metal cavity array profile. For example, it is possible to select a ✓ at which enhancement both at 532 nm and 635 nm is achieved. At the taper angles of up to about 45°, enhancement can be gained at both of these wavelengths, but if the taper angle is greater than about 45° the enhancement at 635 nm is greatly improved.

Figure 42:
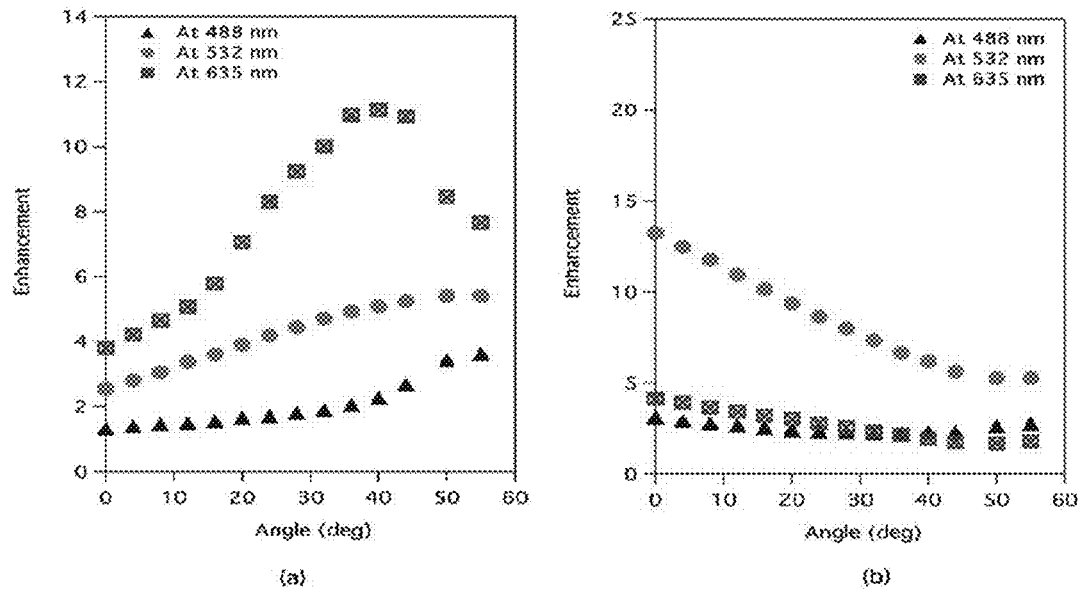
FIG. 42 shows the calculated intensity enhancement through a cavity array in a 100 nm aluminum film on glass with different taper angles. The array parameters were $a_0$=550 nm and d=200 nm. The illumination was from the air side (A) and the glass side (B).
Figure 43:
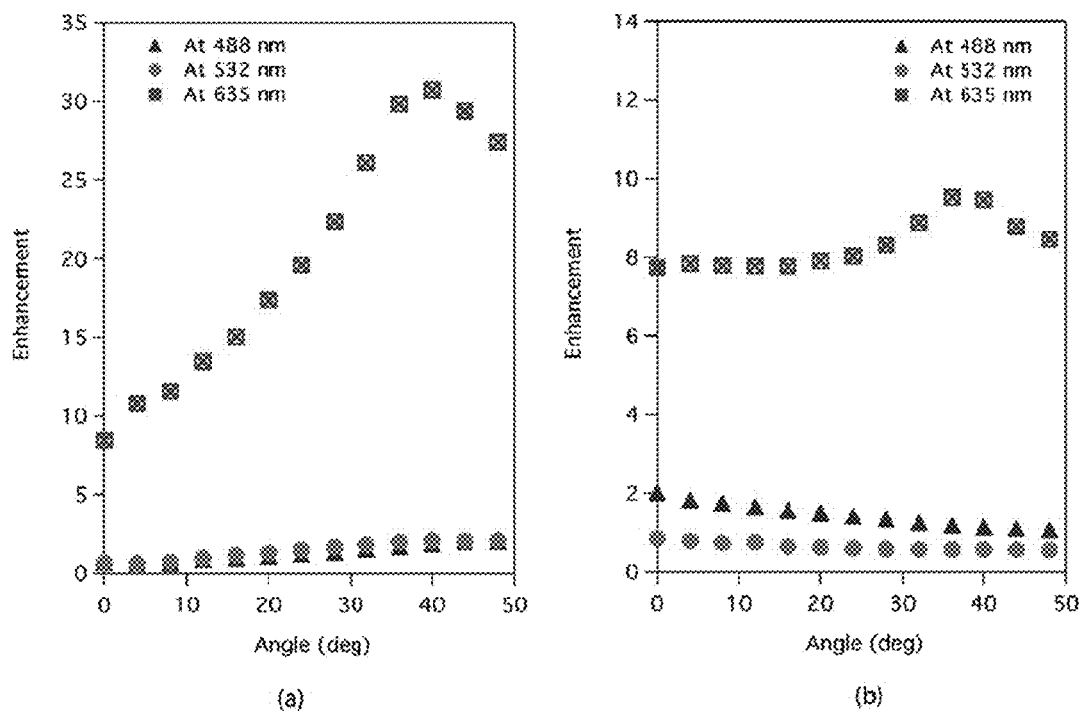
FIG. 43 shows the calculated intensity enhancement through a cavity array in a 100 nm gold film on glass with different taper angles. The array parameters were $a_0$=450 nm and d=200 nm. The illumination was from the air side (A) and the glass side (B).
Figure 44:
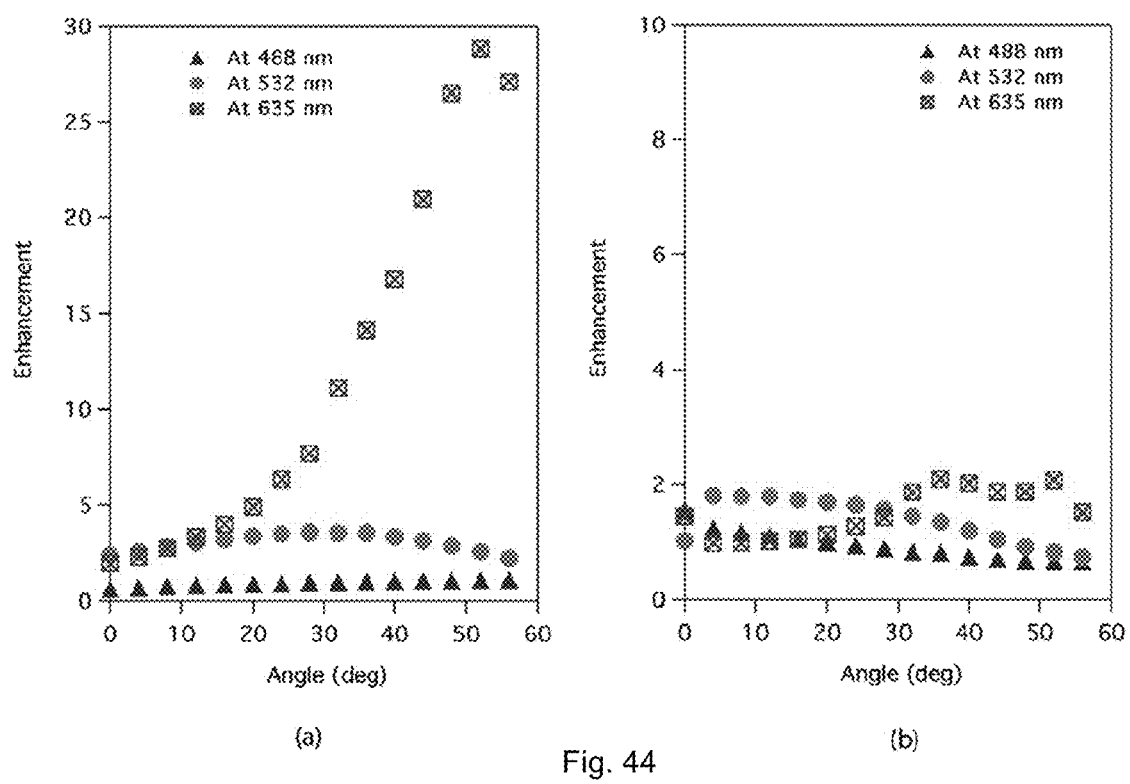
FIG. 44 shows the calculated intensity enhancement through a cavity array in a 100 nm gold film on glass with different taper angles. The array parameters were $a_0$=550 nm and d=200 nm. The illumination was from the air side (A) and the glass side (B).

The dependence of enhancement on the taper angle in case of a single cavity was shown in FIG. 35 in the previous section. For the cavity arrays, a near linear increase with increasing taper angle for wavelengths 532 nm and 635 nm when excited from the air side was observed. However, not a significant increase in enhancement with ✓ was seen at 488 nm, the average enhancement being by a factor of about 2. It is noted that the cavity array under consideration has a periodicity of 500 nm. The transmission spectrum as well as the enhancement spectrum has a minima around $a_0$ which corresponds to the coupling of top SPP interface (metal-air) which can be accurately described as a Fano-type anti-resonance. This coupling corresponds to the interference between two contributions which arise from resonant and non-resonant elements: in this case light directly transmitted through the metal film which interferes with the one reradiated after exciting the localized cavity modes. This minima has a nearly no shift with increasing ✓. The SPPs on top interface are still excited in this case, but the effective coupling strength between these and the bottom SPPs (metal-substrate interface) is much weaker. There is not a large variation in metal dielectric constant (real and imaginary parts) at these wavelengths. In the case of a single cavity, a totally different behavior was observed. This effect became more apparent in the case of a similar array with a different periodicity of 550 nm as seen by a near-linear increase in enhancement with taper angle for a wavelength of 488 nm (see FIG. 42). In order to further generalize this effect, the effect of enhancement and light gathering capacity on taper angle was also studied from an array of cavities in 100 nm Au film shown in FIGS. 43 and 44 for different periodicities. Thus, the role of periodicity is clearly apparent.

Example 3

Passivation of Aluminum Surfaces

Substrate Preparation: Plain glass substrates and glass substrates coated with a 100 nm thick aluminum film were provided by Moxtek Inc., Provo (SEM shown in FIG. The substrates were cleaned using solvent wash. The wash included acetone, isopropyl alcohol and methanol. After the solvent wash, the substrates were rinsed with ddH$_2$O and dried using nitrogen, followed by argon plasma cleaning using Harrick plasma cleaner. The plasma cleaner was operated at medium power setting (200 W). At this point, the substrates were exposed to oxygen stream to create an oxide layer on top of the aluminum. The oxidized substrates were dipped in boiling water for 5 minutes.

Phosphonic Acid Self Assembled Monolayers: Two phosphonic acids were used, n-Decylphosphonic acid (DPA) and n-Butylphosphonic acid (BPA) from Alfa Aesar (purity 98%), as received. Phosphonic acid solutions of 1 mM were made in methanol, a concentration at which the molecules behave as free species in the solution. A passivation layer was self-assembled onto the substrates by leaving it in phosphonic acid solution for 16 hours. After passivation, the passivated substrates were annealed for 4 hrs at 90° C. Physi-sorbed phosphonic acid was removed using triple methanol washes.

Silanization: After cleaning, the substrates were placed in a Fisher Scientific Company oven at 115° C. with a small vial containing 1.5 ml of 3-glycidoxypropyltrimethoxysilane (GPS) (Sigma-Aldrich). The oven was sealed, pumped down, and purged 3 times with ultrapure nitrogen. After 8 hours, the oven was purged with nitrogen and the substrates were removed.

Surface Characterization: Surface wettability was investigated by measuring the advancing contact angles in a sessile water drop experiment. A water drop of 1 µL volume was used in each measurement. Three independent readings were taking for each substrate.

XPS analyses were performed on an Axis Ultra spectrometer from Kratos (Manchester, U.K.) equipped with a concentric hemispherical analyzer and using a mono-chromatized aluminum anode X-ray source maintained at 15 KeV. The substrates were investigated under ultrahigh vacuum conditions: $10^{-8}$-$10^{-7}$ Pa. Substrates were analyzed with a pass energy of 160.0 eV for survey scans and 20.0 eV for high energy resolution elemental scans.

Static ToF-SIMS (Cameca/ION-TOF TOF-SIMS IV) was performed with a monoisotopic 25 keV $^{69}$Ga$^+$ primary ion source. The primary ion (target) current was typically 2 pA, and the raster area of the beam was 500×500 µm$^2$.

Radio-Labeling: The probe oligonucleotides were 3'-end-labeled with [α-32P] dATP using Terminal Transferase (New England Biolabs) labeling kit. The reaction mixture consisted of 5 pmols of 5' end amine terminated oligonucleotide, 5 µL of 10× NE buffer 4, 5 µL of 2.5 mM CoCl$_2$, 0.5 µL Terminal Transferase (20 units/µl), 2.5 µL of a [α-32P] dATP 6000 ci/mmol (Perkin Elmer) and ddH$_2$0 to a final volume of 50 µL. The mixture was incubated at 37° C. for 30 minutes. 10 µL of 0.2M EDTA (pH8.0) was added to terminate the reaction. The products were purified using spehadex g25 columns. The purified product was spiked with 245 pmols of unlabeled oligonucleotide. The solution was dried using speed vac. Dried oligonucleotide was re-suspended in 150 mM phosphate buffer (pH=8.5). Silanized substrates were spotted with 1 µL of 500, 50, 5 and 0.5 µM solutions of oligonucleotide. After spotting, the substrates were kept at room temperature in a humid chamber for at least 12 hours. The substrates were then rinsed with ddH$_2$O and blown dry with N$_2$. These substrates were scanned using phosphor-screen.

The contact angle on cleaned aluminum and glass substrates were almost zero, indicating that the droplets were completely wetting these surfaces. After surface treatment with the alkyl phosphonic acids, the aluminum surfaces became hydrophobic. The contact angle observed for BPA coated aluminum was 82.5 and 103.2 for DPA coated aluminum. This corresponds well with the length of the alkyl chain of these molecules. The contact angle on glass was about 15, probably due to accumulation of adventitious carbon. The contact angle on silanized glass substrates was 61.

To further analyze the films, XPS characterization was done to understand the chemical identity of the surface. First, the formation of an oxide layer on aluminum was confirmed by XPS characterization. XPS spectra of Al 2p were taken on oxidized, unmodified Al substrates. An Al 2p spectrum was resolved into a metallic and oxide component by fitting in the 70-80 eV binding energy regions. The fitted spectrum illustrated the presence of an oxide peak at the binding energy of 75.2 eV as well as an Al metal peak at 72.3 eV. This agrees well with binding energy separation of 2.8 eV reported in XPS-spectra handbook. The chemical surface composition of clean and unmodified Al was determined by XPS to be 37, 49, and 14 at. % for Al, O, and C, respectively. As stated earlier, the presence of oxide on the Al surface is required for the phosphonate reaction.

Next, XPS characterization was used to confirm the adsorption of the alkyl phosphonic acids to aluminum. XPS spectra of modified aluminum substrates showed phosphorus peaks 2s and 2p peaks, indicating modification of the Al surface. These peaks were absent for glass substrates after treating with a similar process of alkyl phosphonic acid modification as with aluminum. High-resolution spectra were collected for O 1s, C 1s, P 2p and Al 2p peaks and the atomic % of these peaks are shown in Table 1, below.

TABLE 1

Atomic % calculated from high resolution XPS scan

|  | O | C | P | Al |
|---|---|---|---|---|
| Al + BPA | 30.17 | 19.35 | 5.11 | 46.37 |
| Al + DPA | 28.15 | 29.86 | 2.43 | 39.56 |

As determined from Table 1, The C/P ratio for DPA was 12.3. This is close to the theoretical value of 10. This shift is probably due to either adventitious carbon or due to protruding long alkyl chains, resulting in a higher C atomic % as compared to P due to the higher exit thickness for the energetically lower P photoelectrons. Similar trends have been reported by other papers when they observed complete coverage. See Hogue, E., et al., Alkylphosphonate Modified Aluminum Oxide Surfaces. *The Journal of Physical Chemistry B* 2006, 110, (22), 10855-10861. The C/P value for BPA was lower than theoretical value, which may mean that BPA does not form a complete monolayer. This trend has been reported in other studies with smaller alkyl chain SAMs, because they tend to form irregular structured films. Alkyl chain length has a strong influence on the molecular packing during self-assembly; the longer the chain length, the better the orientation of the molecules on the surfaces. The longer chains are better able to self-assemble due to an increase in van der Waals (vdW) attractive forces with increasing chain length, because the strength of the vdW interactions per adsorbate is proportional to the number of methylene units in the adsorbate. See Ulman, A., Formation and Structure of Self-Assembled Monolayers. *Chemical Reviews* 1996, 96, (4), 1533-1554; Spori, D. M.; Venkataraman, N. V.; Tosatti, S. G. P., et al., Influence of Alkyl Chain Length on Phosphate Self-Assembled Monolayers. *Langmuir* 2007, 23, (15), 8053-8060.

Surface imaging mode was used to investigate the coverage of the phosphonic acid layer. Positive secondary ion spectra did not show any characteristic peak for the modified aluminum surface. However characteristic peaks for phosphonic acids were observed in the negative ion spectra. Two fragmentation peaks of the phosphonic acid group, $PO_2^-$, and $PO_3^-$, confirmed the presence of the acids on the surface of aluminum coated substrates. The phosphate ion fragment peak signals were almost down to the background level in case of glass substrates, which confirmed the selective formation of phosphonic layer on aluminum coated substrates.

Radio-labeling experiments showed the effectiveness of the passivation layer at preventing silanization and oligo/DNA immobilization. As noted above, silanized glass and silanized aluminum substrates were each spotted with four serial dilution spots (at increasing concentration) of oligonucleotide. A phosphor-screen was used to observe the immobilized oligonucleotides. On each of these substrates, the phosphor-screen showed four visible spots, indicating attachment of both silane molecules and the oligonucleotides.

However, the aluminum substrates which were subjected to the alkyl phosphonic acid passivation treatment showed either no immobilized oligonucleotides or much less immobilized oligonucleotide than the unpassivated aluminum substrates. In the case of the DPA modified aluminum substrate, no oligonucleotide spots were visible, which indicated that a passivation of 1/1000 was possible with these substrates. In the case of BPA modified aluminum substrate, the highest concentration spot of oligonucleotide was slightly visible, but the other three spots at lower concentrations were absent. Thus, the BPA modified aluminum substrates also exhibited the ability to passivate against silanization and oligonucleotide attachment, but to a slightly lesser degree than DPA.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

All publications, patent applications, issued patents, and other documents referred to in this specification are herein incorporated by reference as if each individual publication, patent application, issued patent, or other document were specifically and individually indicated to be incorporated by reference in its entirety. Definitions that are contained in text incorporated by reference are excluded to the extent that they contradict definitions in this disclosure.

For the purposes of this disclosure and unless otherwise specified, "a" or "an" means "one or more."

What is claimed is:

1. A light enhancement device comprising
   a) a substrate;
   b) a film of metal disposed over the substrate, the film of metal comprising at least one cavity exposing the substrate, the at least one cavity comprising a tapered sidewall characterized by an angle, wherein the angle of the tapered sidewall with respect to a surface parallel to the substrate is sufficiently different than 90° to provide an enhancement of the transmission of light through the cavity, an enhancement of the intensity of light within the cavity, or both, that is greater than the enhancement if the angle was 90°; and
   c) at least one biomolecule disposed in the at least one cavity.

2. The device of claim 1, wherein the at least one cavity has the shape of a truncated cone.

3. The device of claim 1, wherein a surface of the film of metal opposite the substrate is substantially flat.

4. The device of claim 1, wherein the film of metal comprises two or more layers of metal.

5. The device of claim 1, further comprising a passivation layer disposed over the film of metal, wherein the passivation layer is capable of preventing adsorption of a molecule of interest to the film of metal.

6. The device of claim 5, wherein the film of metal comprises aluminum and the passivation layer comprises butyl phosphonic acid.

7. A light enhancement device comprising:
   a) a substrate;
   b) a film of metal disposed over the substrate;
   c) at least one cavity in the metal film exposing the substrate and having a sidewall;
   d) at least one change in the sidewall within the cavity including a change in angle or a change in width or combinations thereof sufficient to provide an enhancement of the transmission of light through the cavity, an enhancement of the intensity of light within the cavity, or both, that is greater than the enhancement without the change in the sidewall; and
   e) at least one biomolecule disposed in the at least one cavity.

8. The device of claim 7, wherein the at least one change in the sidewall within the cavity further includes a change in material.

9. The device of claim 7 wherein the sidewall includes arcuate sections.

10. The device of claim 7, wherein the film of metal comprises two or more layers of metal.

11. The device of claim 7 wherein the at least one cavity is an elongated trench.

12. The device of claim 7, further comprising a passivation layer disposed over the film of metal, wherein the passivation layer is capable of preventing adsorption of a molecule of interest to the film of metal.

13. The device of claim 12, wherein the film of metal comprises aluminum and the passivation layer comprises butyl phosphonic acid.

14. A light enhancement device comprising:
   a) a substrate;
   b) a film of metal disposed over the substrate having a thickness less than 500 nm;
   c) at least one nanoaperture in the metal film exposing the substrate and having a width less than 500 nm; and
   d) at least a portion of a sidewall of the at least one nanoaperture being non-parallel with respect to a surface normal to the substrate.

* * * * *